Sept. 2, 1958   J. DAUGHERTY ET AL   2,849,927
PLANER TYPE SKIN MILLING MACHINE
Original Filed July 28, 1951   22 Sheets-Sheet 1
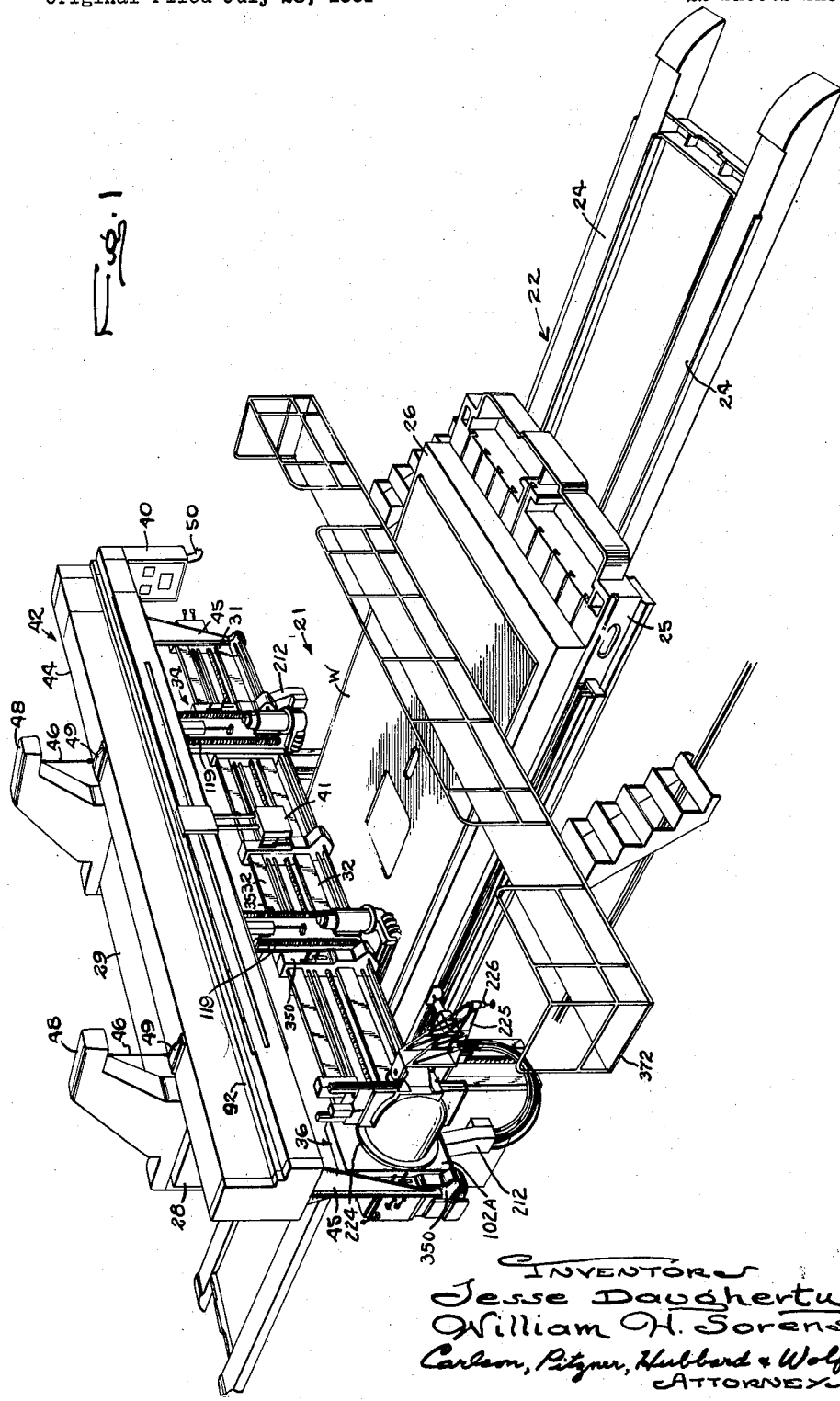

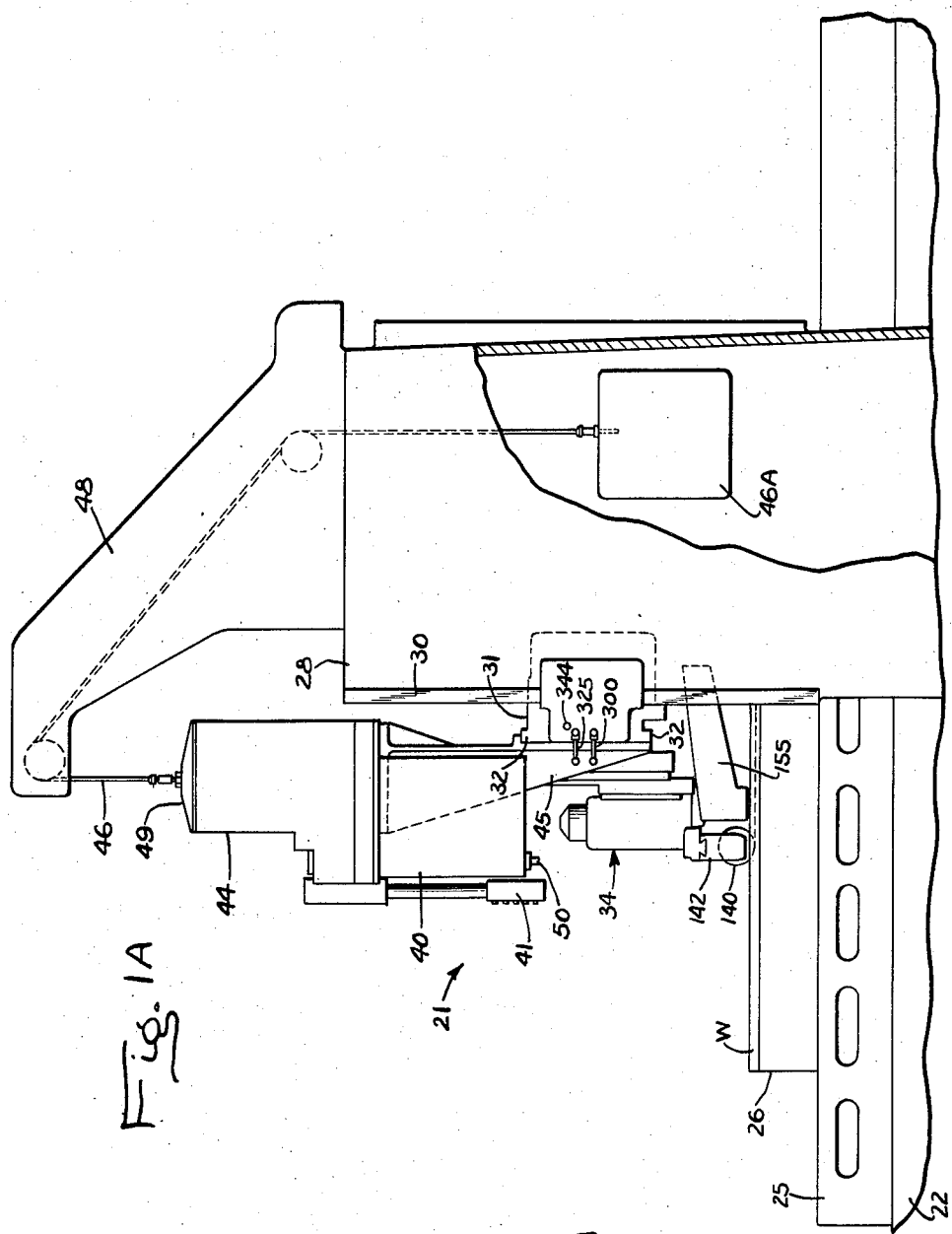

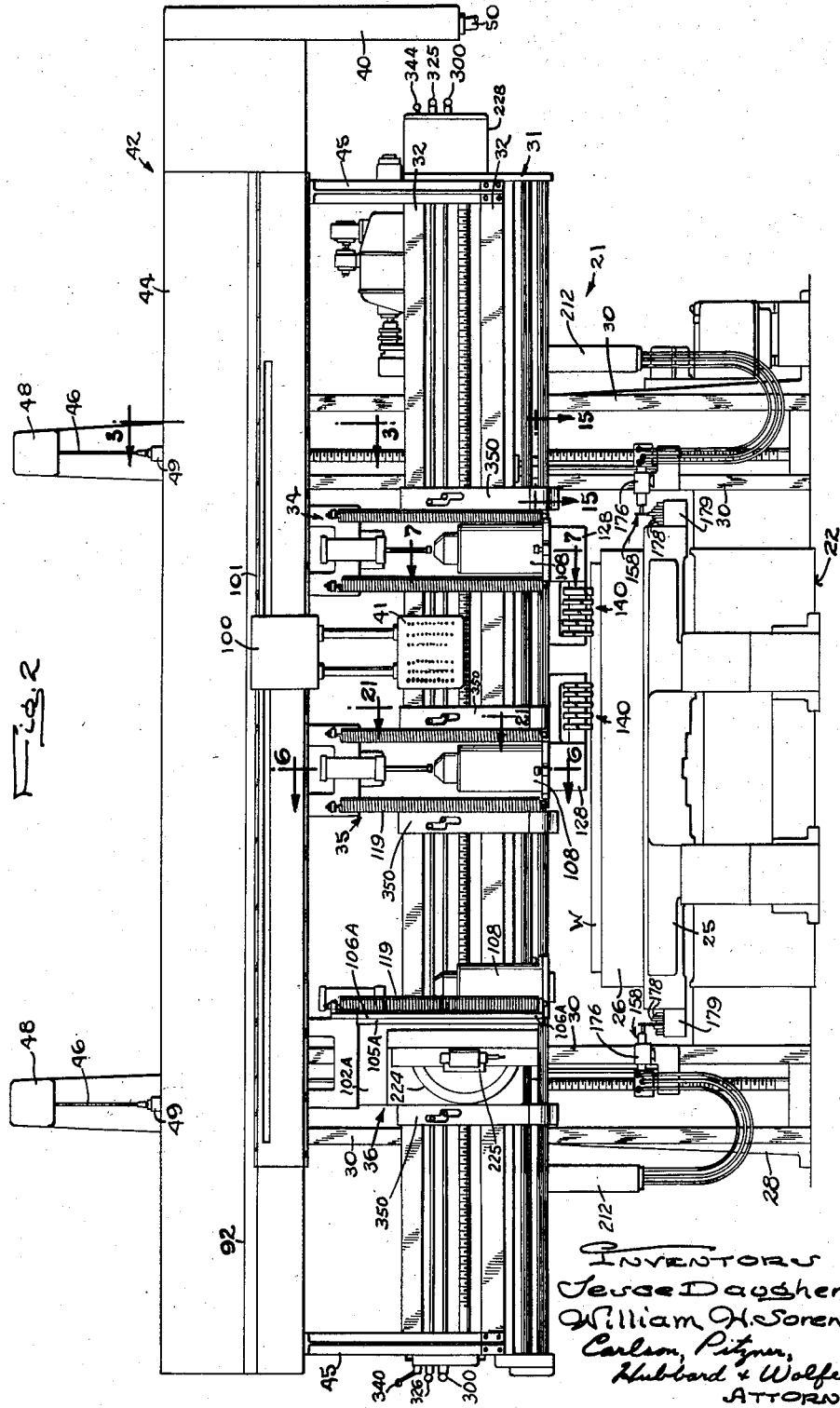

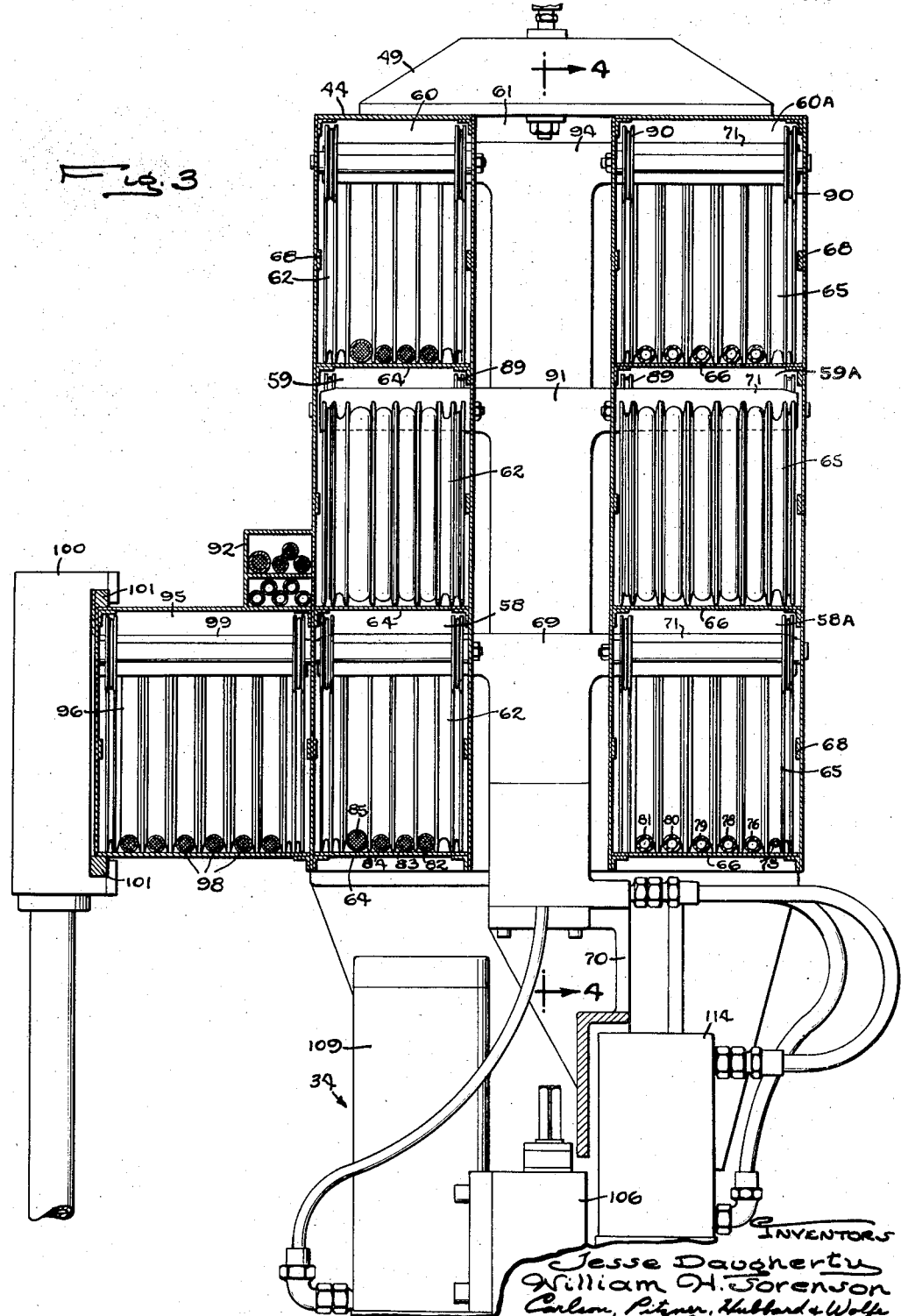

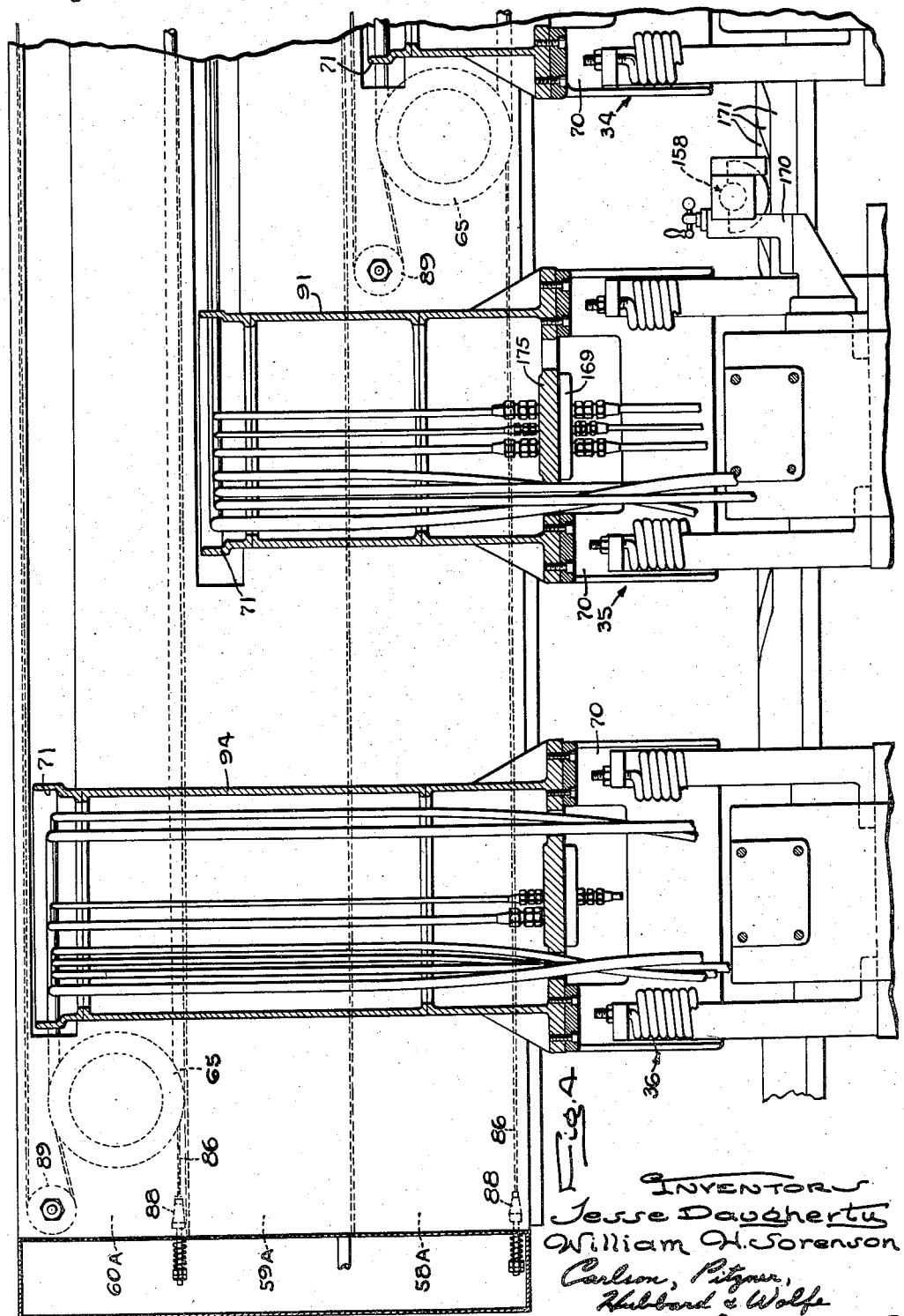

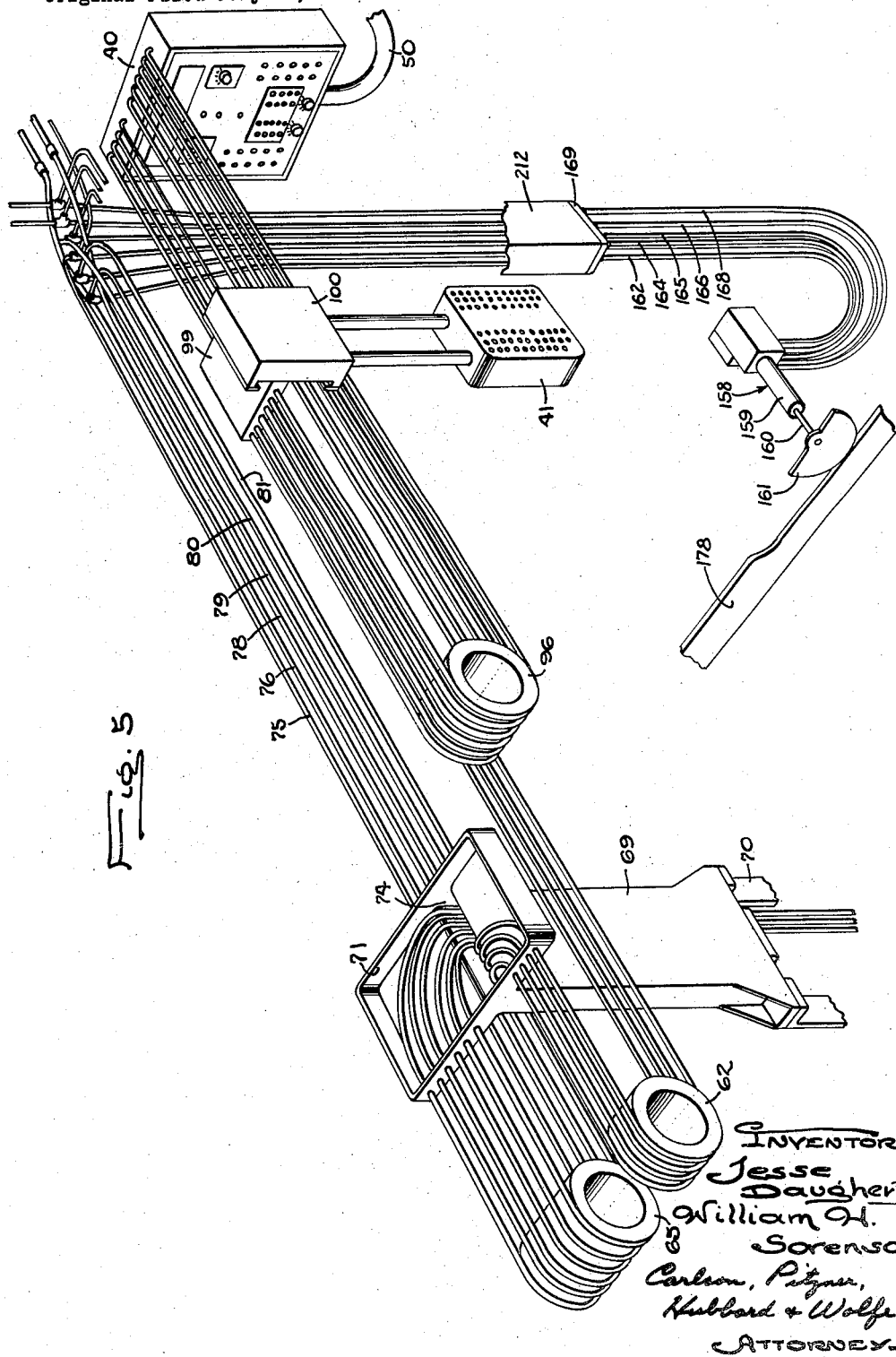

Sept. 2, 1958 J. DAUGHERTY ET AL 2,849,927
PLANER TYPE SKIN MILLING MACHINE
Original Filed July 28, 1951 22 Sheets-Sheet 7
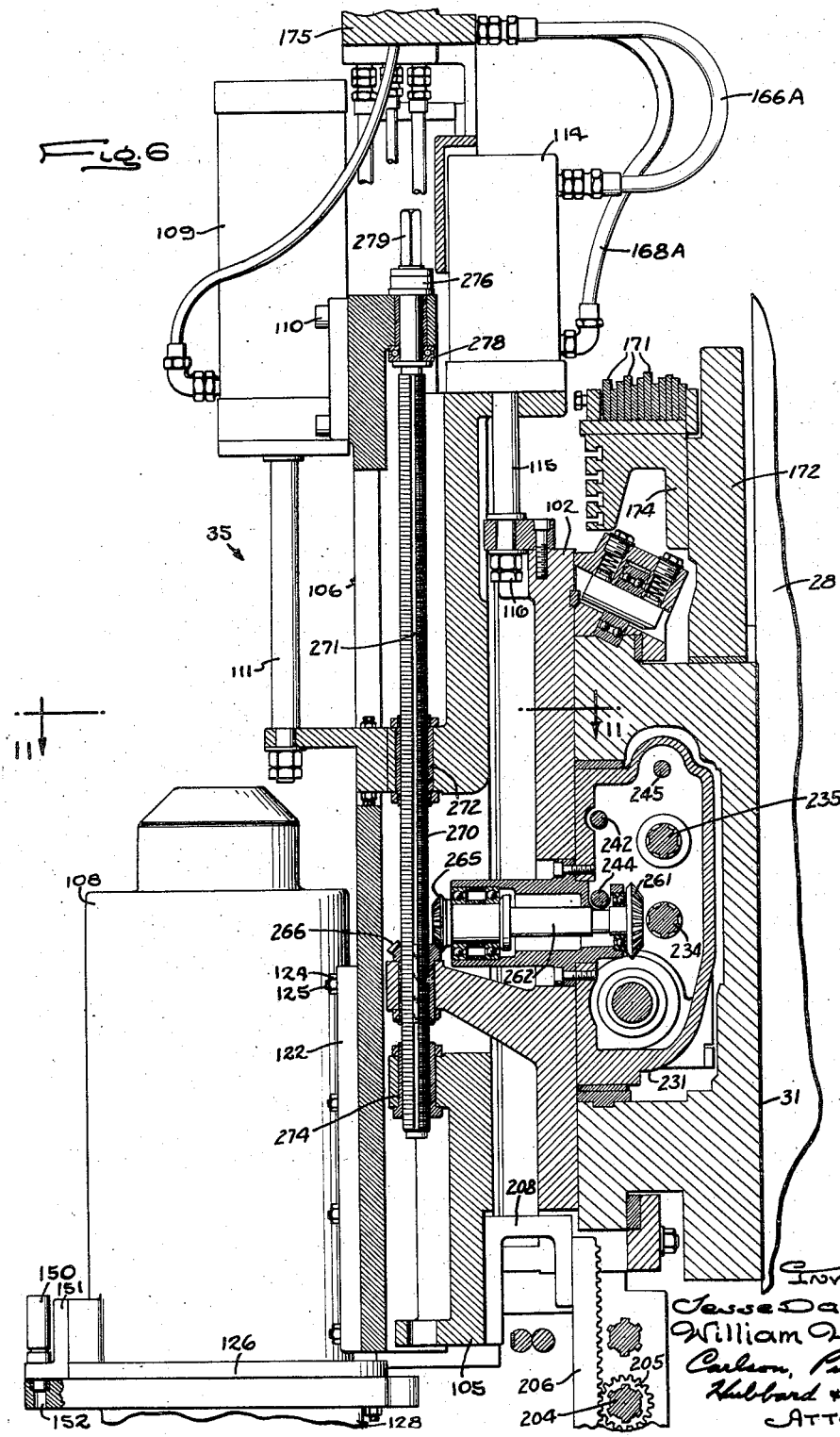

Sept. 2, 1958  J. DAUGHERTY ET AL  2,849,927
PLANER TYPE SKIN MILLING MACHINE
Original Filed July 28, 1951  22 Sheets-Sheet 8

INVENTORS
Jesse Daugherty
William H. Sorenson
Carlson, Pitzner, Hubbard + Wolfe
ATTORNEY

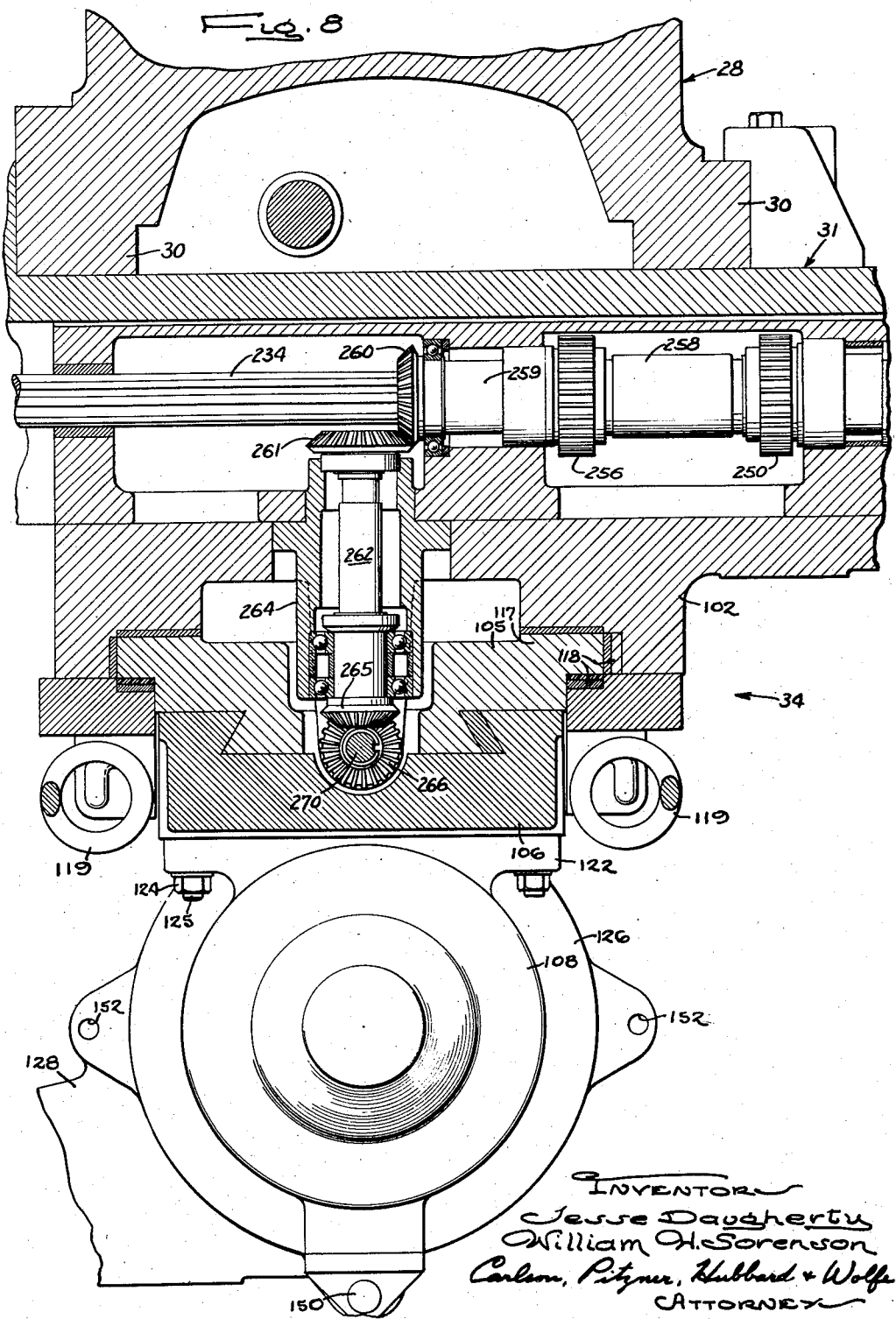

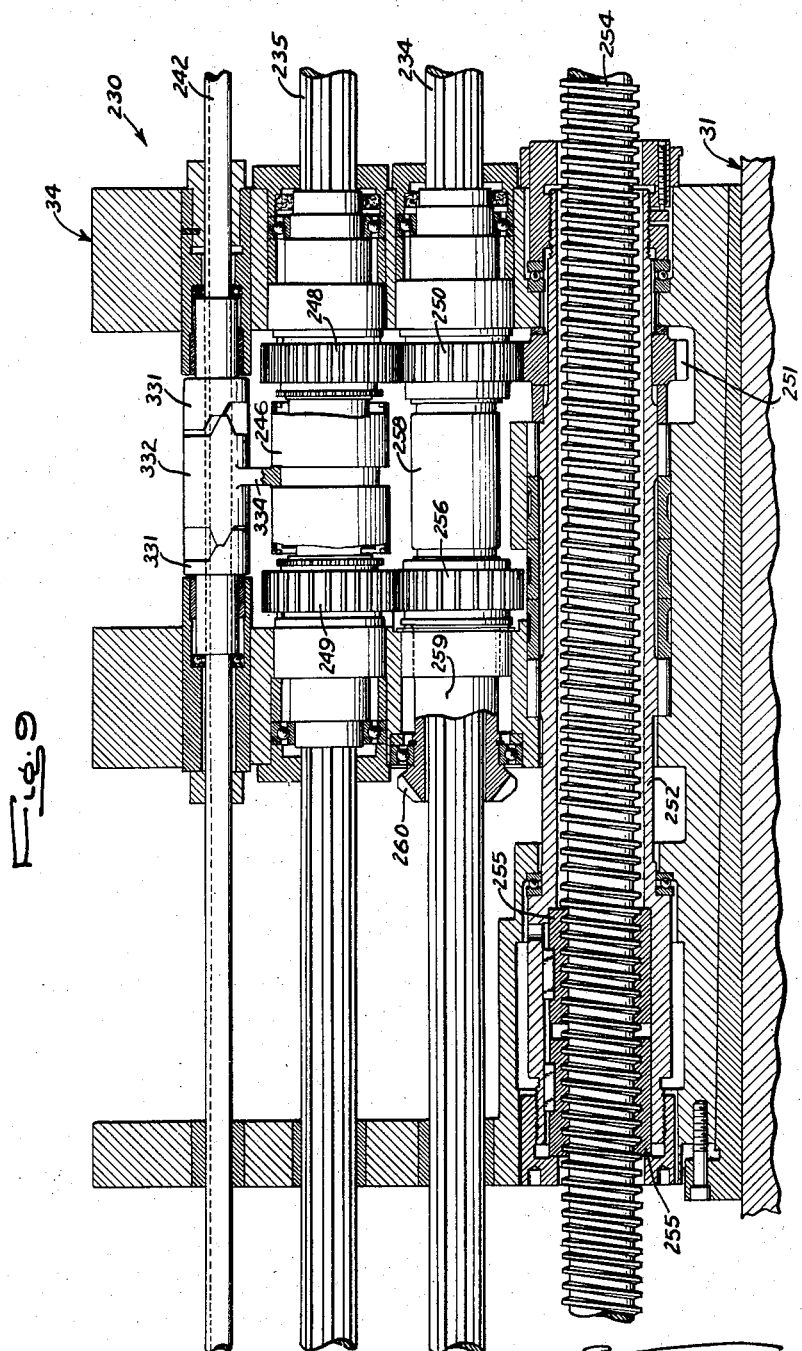

Sept. 2, 1958 J. DAUGHERTY ET AL 2,849,927
PLANER TYPE SKIN MILLING MACHINE
Original Filed July 28, 1951 22 Sheets-Sheet 11
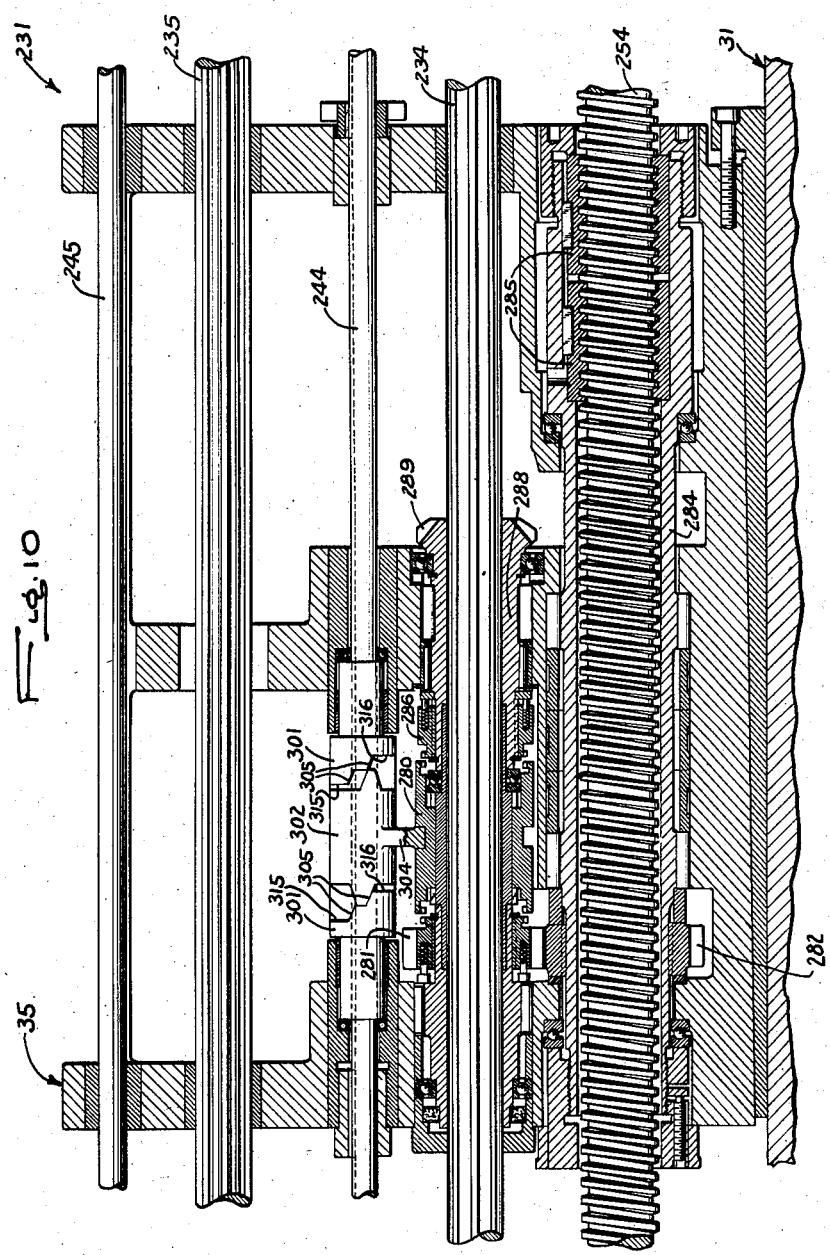

Sept. 2, 1958 J. DAUGHERTY ET AL 2,849,927
PLANER TYPE SKIN MILLING MACHINE
Original Filed July 28, 1951 22 Sheets-Sheet 12
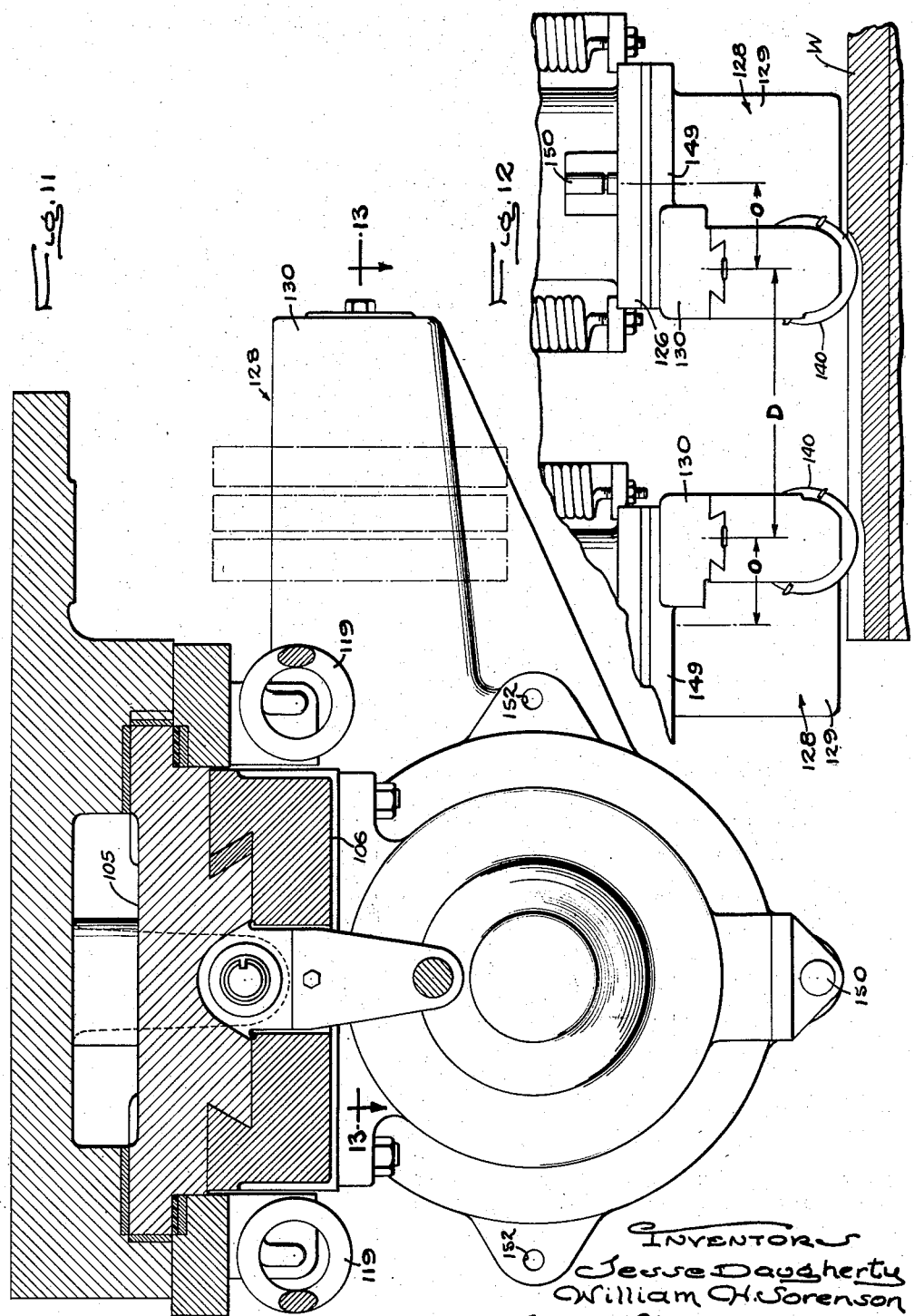

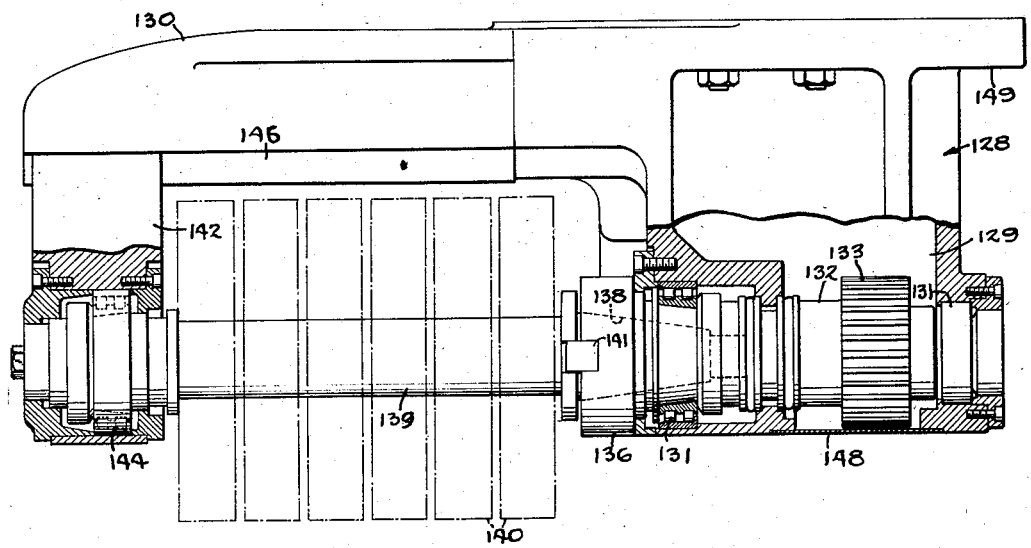
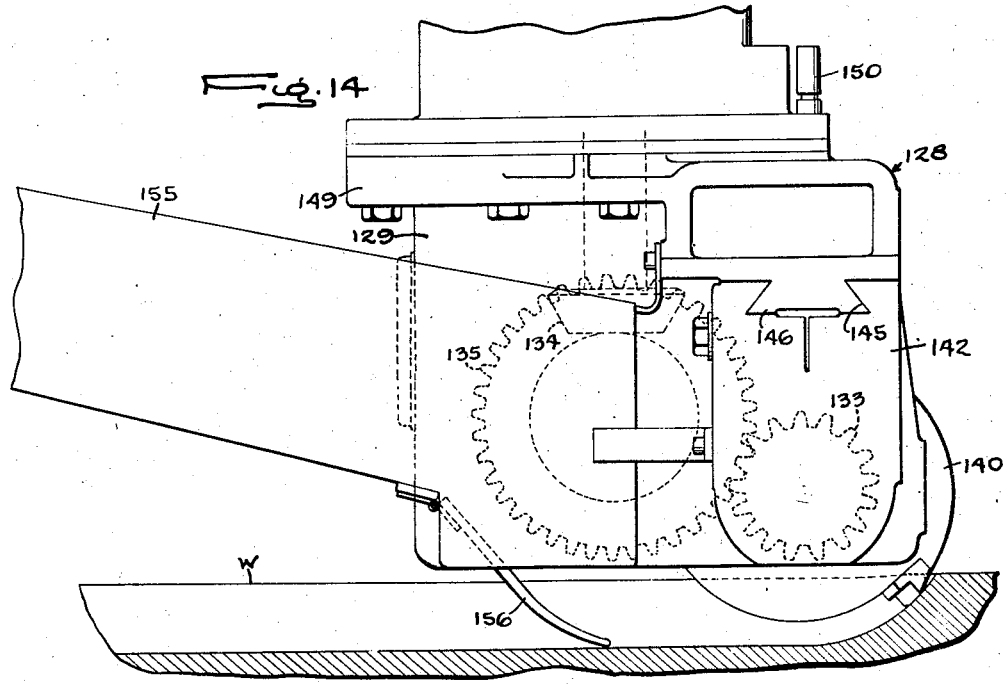

Sept. 2, 1958 J. DAUGHERTY ET AL 2,849,927
PLANER TYPE SKIN MILLING MACHINE
Original Filed July 28, 1951 22 Sheets-Sheet 14

INVENTORS
Jesse Daugherty
William H. Sorenson
Carlson, Pitzner, Hubbard & Wolfe
ATTORNEYS

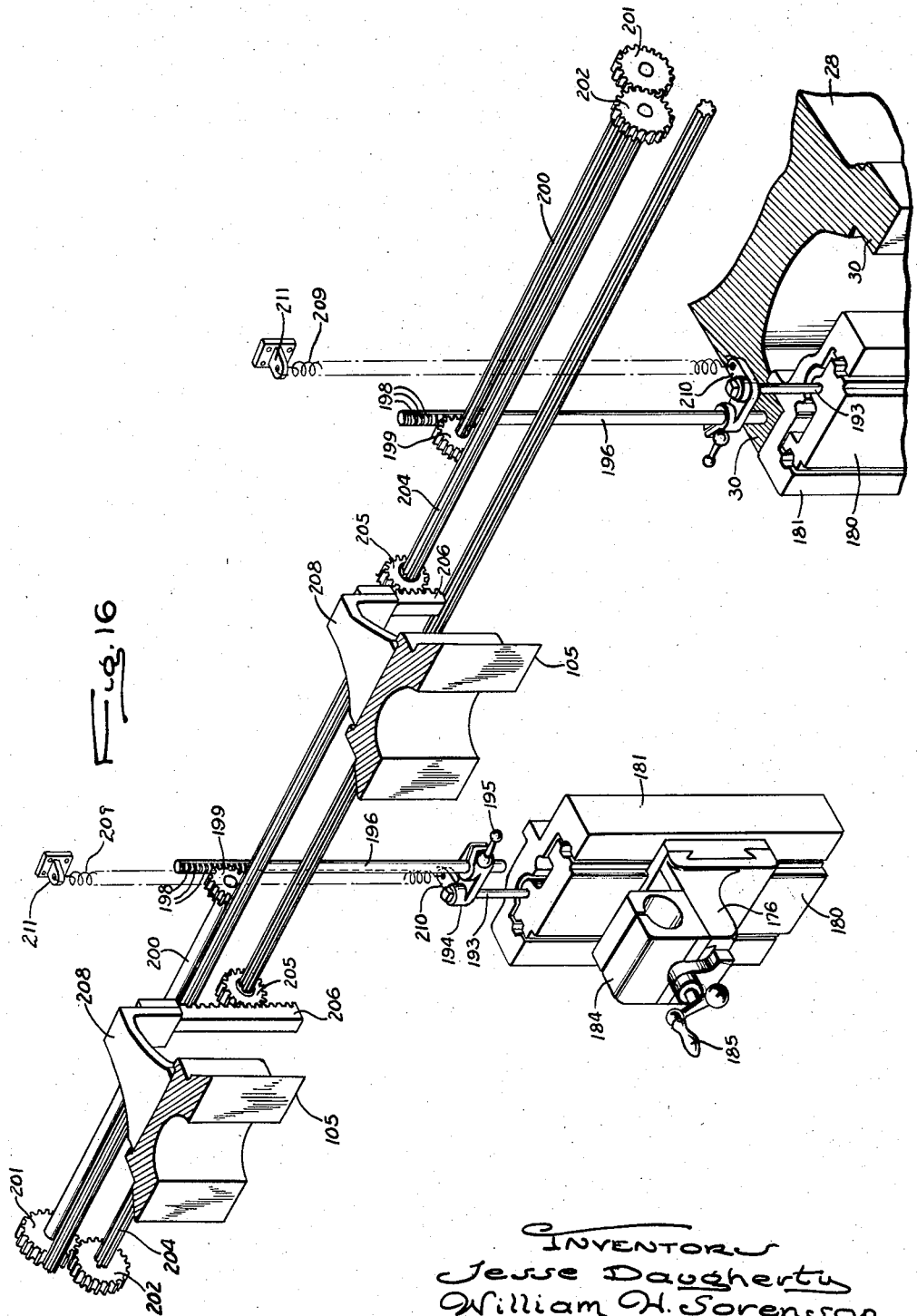

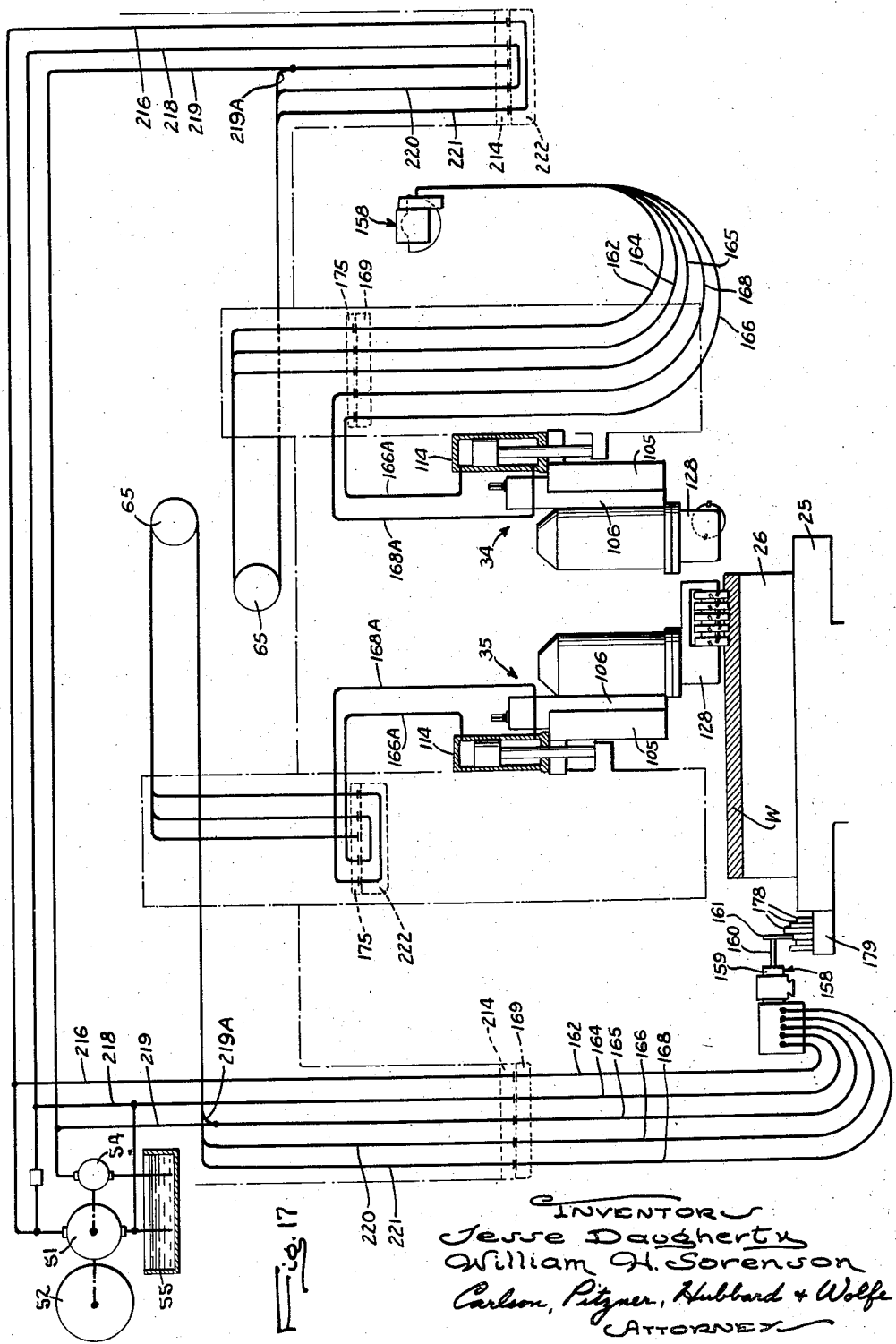

Sept. 2, 1958 J. DAUGHERTY ET AL 2,849,927
PLANER TYPE SKIN MILLING MACHINE
Original Filed July 28, 1951 22 Sheets-Sheet 18
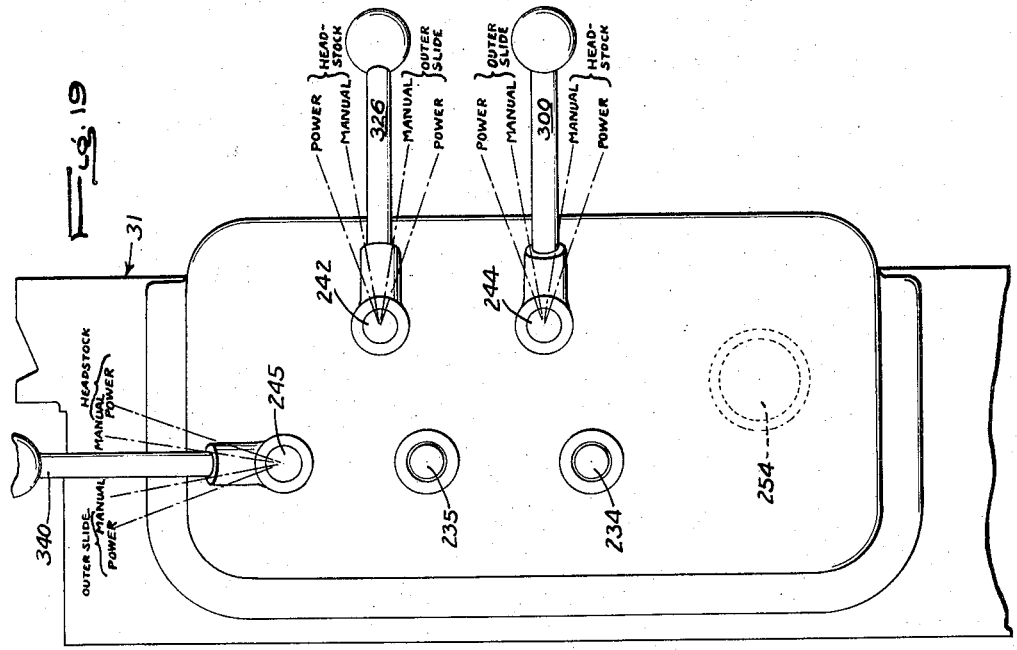
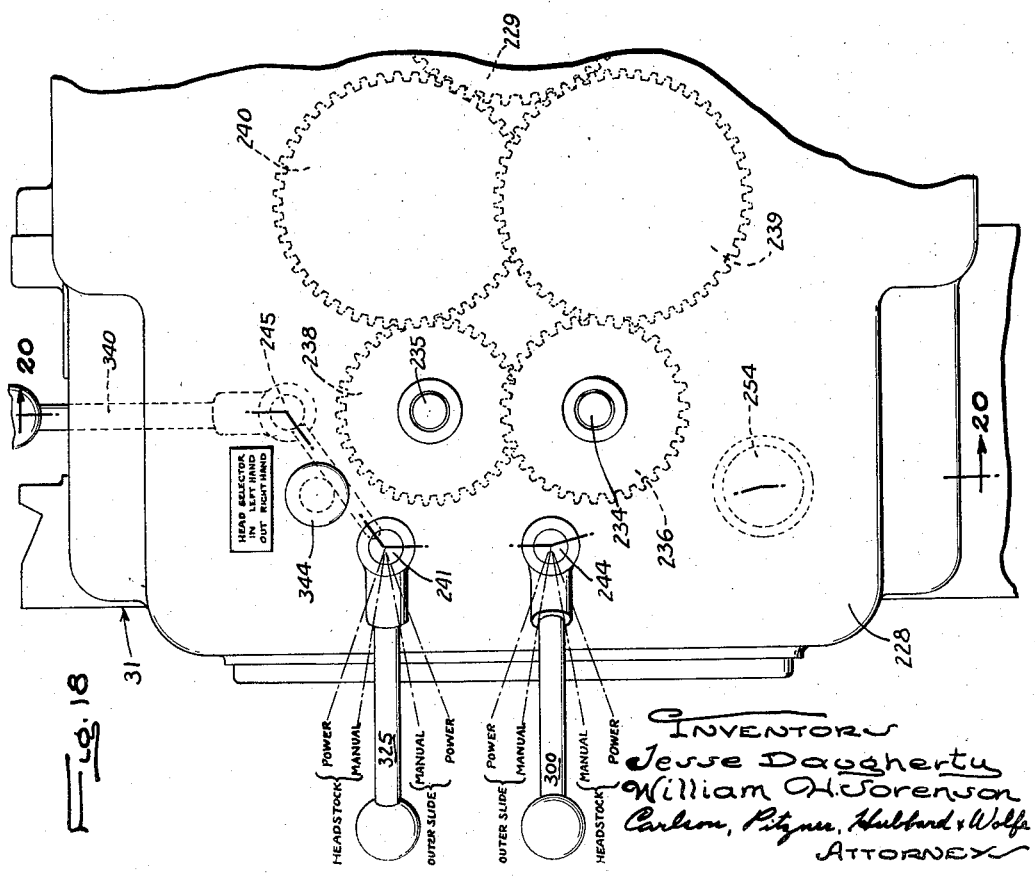

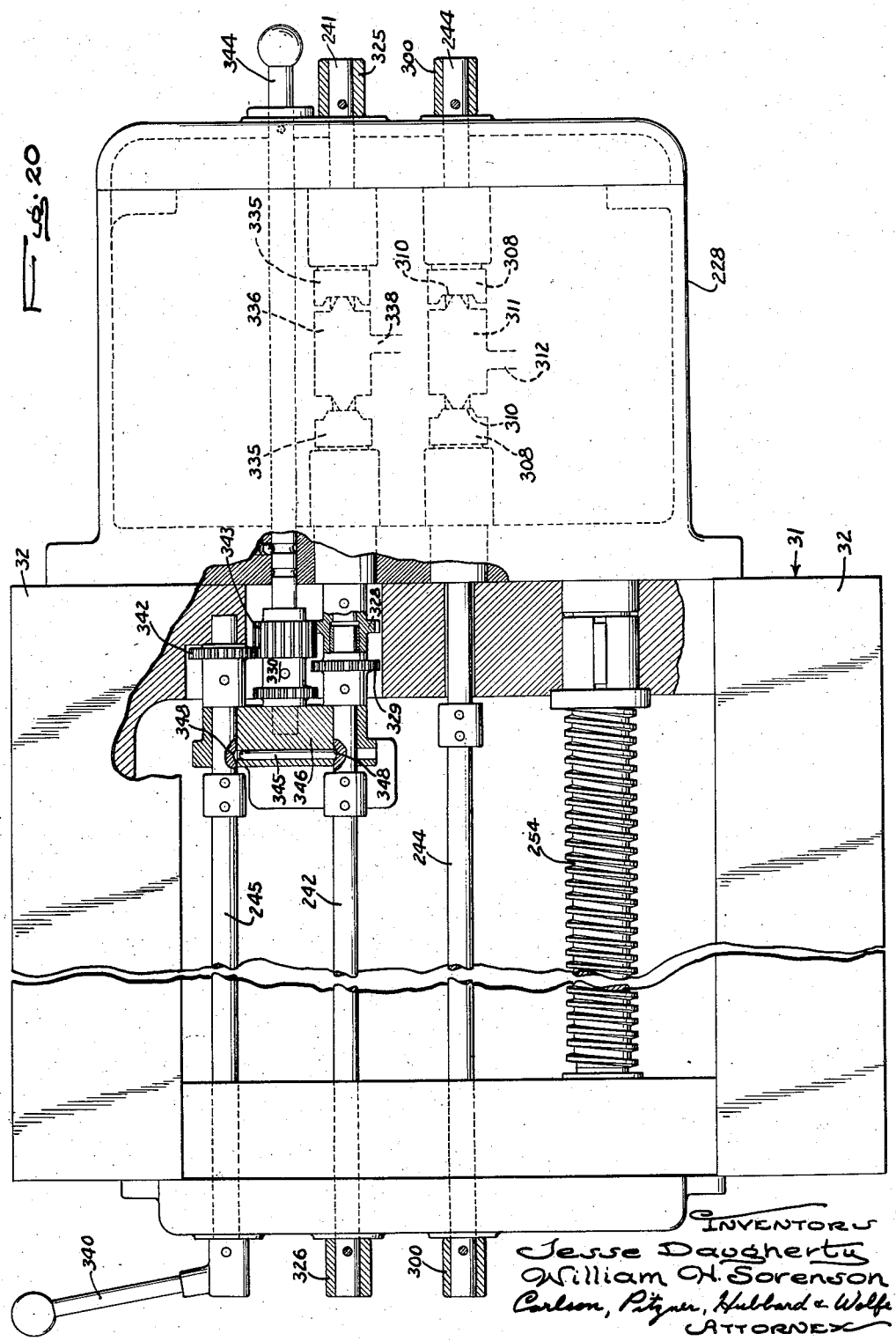

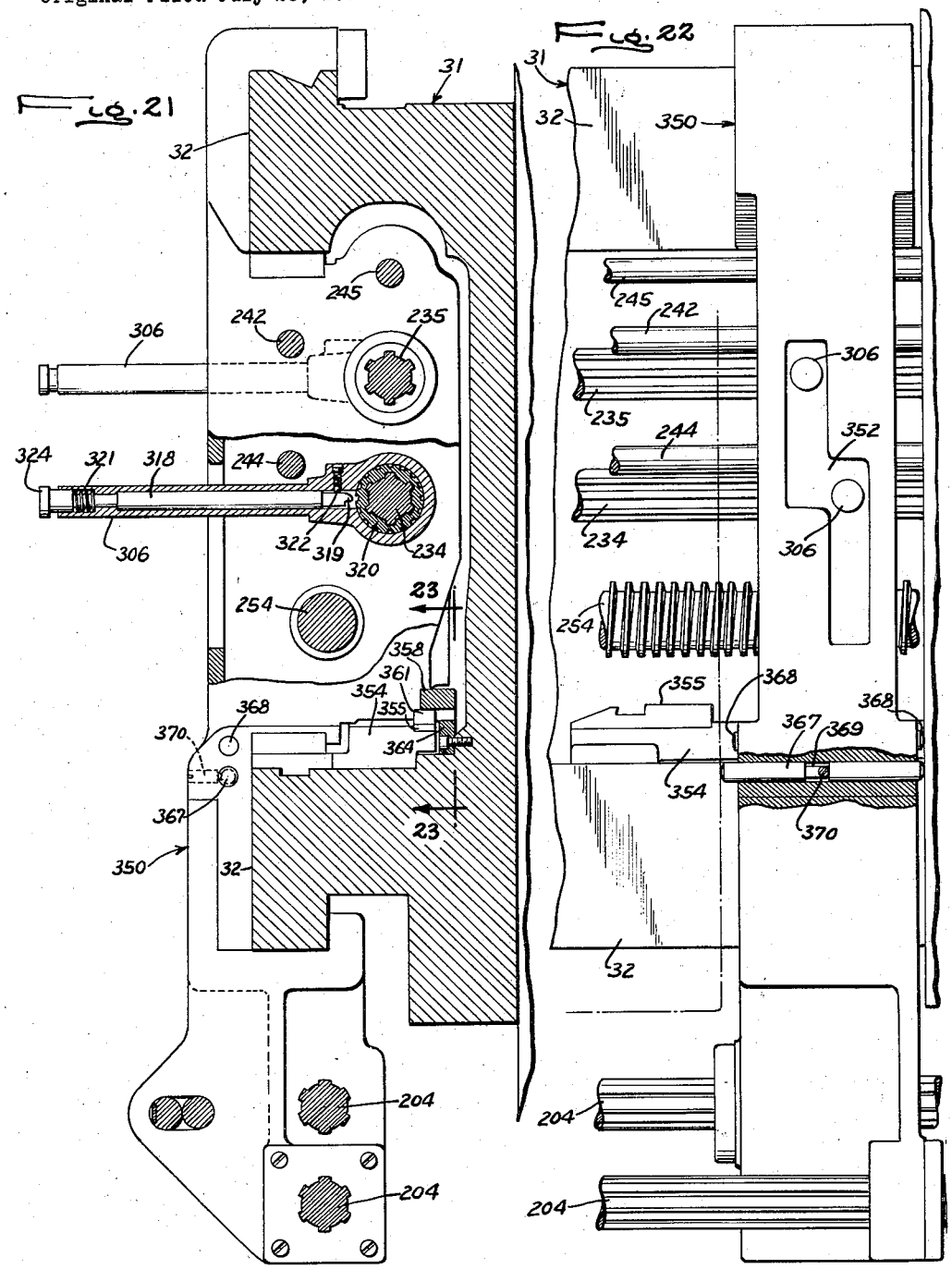

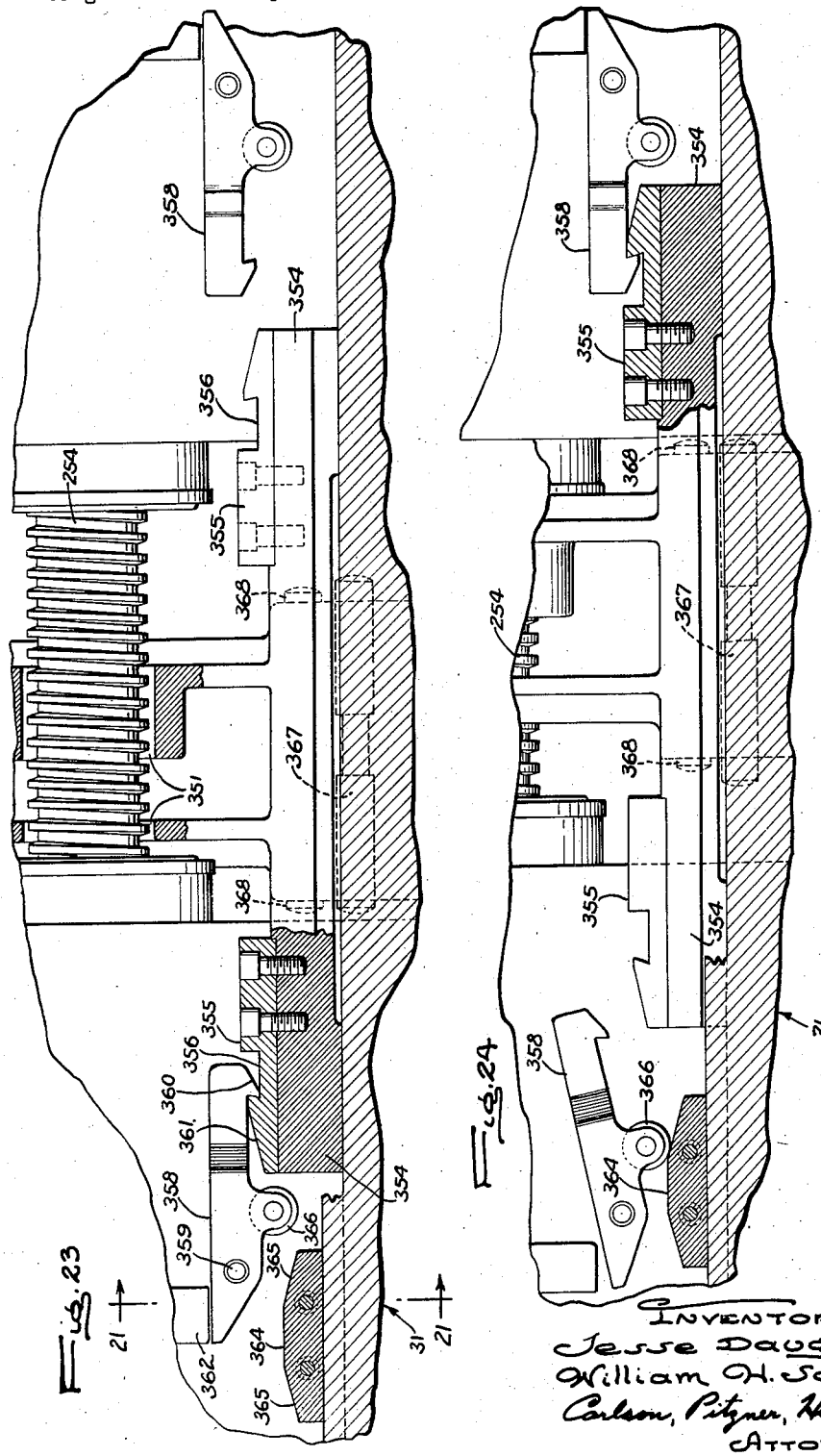

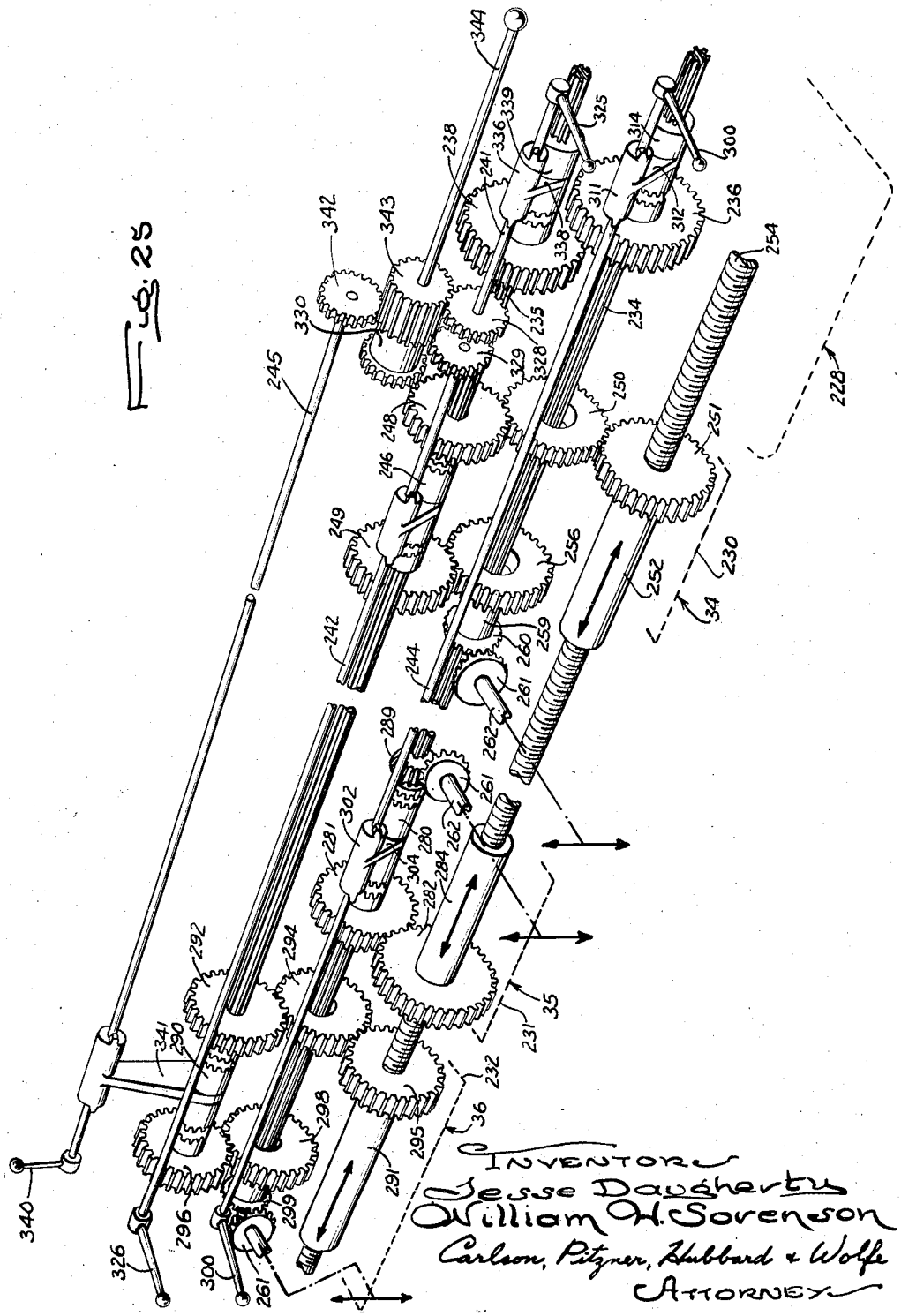

United States Patent Office 2,849,927
Patented Sept. 2, 1958

2,849,927

PLANER TYPE SKIN MILLING MACHINE

Jesse Daugherty and William H. Sorenson, Fond du Lac, Wis., assignors to Giddings & Lewis Machine Tool Company, Fond du Lac, Wis., a corporation of Wisconsin Continuation of application Serial No. 239,158, July 28, 1951. This application April 5, 1956, Serial No. 576,473

14 Claims. (Cl. 90—13)

This is a continuation of our co-pending application Serial No. 239,158, filed July 28, 1951, now abandoned.

The present invention relates in general to the field of machine tools and more specifically to a high speed planer type milling machine of exceptionally large size and capacity. The invention finds particular, but by no means exclusive, utility when embodied in a machine for performing skin milling operations on light weight metal slabs or plates such as those used for the surface panels of aircraft.

One object of the invention is to provide a high speed, planer type skin miller capable of machining aircraft surface panels and the like to precise dimensions, being adapted to mill tapered panels as well as integrally ribbed panels having surfaces or webs that vary in thickness by means of individually powered headstocks, mounted, driven, and controlled to carry out the machining operations automatically.

Another object is to provide a planer type skin milling machine having a plurality of individually driven headstocks mounted for translational movement and for rise and fall movement upon a common support, and to govern the relative movement of the workpiece and headstocks so that the workpiece is machined to a predetermined configuration.

A further more specific object is to provide a machine of the character set forth and wherein each vertical profiling headstock is susceptible of tracer control through a profiling device mounted directly upon the headstock or at an alternative station located remote from the headstock.

Another object is to provide a skin milling machine of the type set forth and having a novel means for feeding a plurality of flexible lines or conduits to the various headstocks without interference or intolerable drag, thus minimizing the possibility of failure during operation and also avoiding impairment of the machining accuracy of the headstocks.

Still another object is to provide a machine of the foregoing type which will be susceptible of easy and substantially fool-proof operation, being equipped with adequate interlocks in its controls and appropriate means for rapidly retracting its cutters.

A further object is to provide a skin milling machine of the character set forth and which is of simplified, rugged construction, entailing a minimum number of parts consistent wtih the purposes of the machine.

Other objects and advantages will become apparent as the following description proceeds, taken in connection with the accompanying drawings, in which:

Figure 1 is a front perspective view of an illustrative planer-type skin miller embodying the present invention.

Fig. 1A is a side elevational view of the machine of Fig. 1 showing the counterweighting of the cross rail and service housing.

Fig. 2 is a front elevational view of the illustrative machine shown in Fig. 1.

Fig. 3 is an enlarged, fragmentary, vertical sectional view taken primarily through the multiple line feed means in the upper portion of the machine, as indicated by the plane of the line 3—3 in Fig. 2.

Fig. 4 is an enlarged, fragmentary, vertical sectional view taken longitudinally through the line feed means and in the plane of the line 4—4 in Fig. 3.

Fig. 5 is a perspective view detailing certain portions of the multiple line feed means and the flexible lines trained thereover.

Fig. 6 is an enlarged, fragmentary, sectional view taken vertically through the cross rail and the center headstock, as indicated by the line 6—6 in Fig. 2.

Fig. 8 is an enlarged fragmentary sectional view taken horizontally through the cross rail and the right-hand headstock, as indicated by the line 8—8 in Fig. 7.

Fig. 9 is a developed sectional view through the transmission at the rear of the right-hand headstock.

Fig. 10 is a developed sectional view through the transmission at the rear of the center headstock.

Fig. 11 is a further enlarged horizontal sectional view taken through the center headstock and in the plane of the line 11—11 in Fig. 6.

Fig. 12 is an enlarged vertical sectional view taken transversely of the machine and showing the right-hand and center headstocks in position for cross milling operation.

Fig. 13 is an enlarged fragmentary, vertical sectional view detailing one of the right angle milling attachments and taken in the plane of the line 13—13 in Fig. 11.

Fig. 14 is another enlarged fragmentary, vertical sectional view of a right angle milling attachment but taken in a plane perpendicular to that of Fig. 13.

Fig. 16 is an enlarged perspective view detailing the mechanical connections between the tracer control valve slides and their associated slides on the headstocks.

Fig. 17 is a diagrammatic view illustrating the circuit connections for the hydraulic tracer control valves associated with the right-hand and center headstocks.

Figs. 18 and 19 are right and left-hand end views, respectively, of the cross rail and show the feed drive transmission and certain control levers therefor.

Fig. 20 is a developed sectional view taken through the feed drive transmission and controls shown in Figs. 18 and 19, as indicated by the line 20—20 Fig. 18.

Fig. 21 is an enlarged, fragmentary, vertical sectional view through one of the rail shaft support brackets, as indicated by the line 21—21 in Fig. 2.

Fig. 22 is a front elevation of the support bracket of Fig. 21, showing an interlock mechanism in vertical section.

Figs. 23 and 24 are enlarged, fragmentary, rear elevational views of the latch and interlock mechanisms associated with the rail shaft support bracket of Fig. 21, such view being taken in the plane of the line 23—23.

Fig. 25 is a perspective view diagrammatically illustrating the feed drive mechanism and its shifter controls.

Figures 7, 7A:
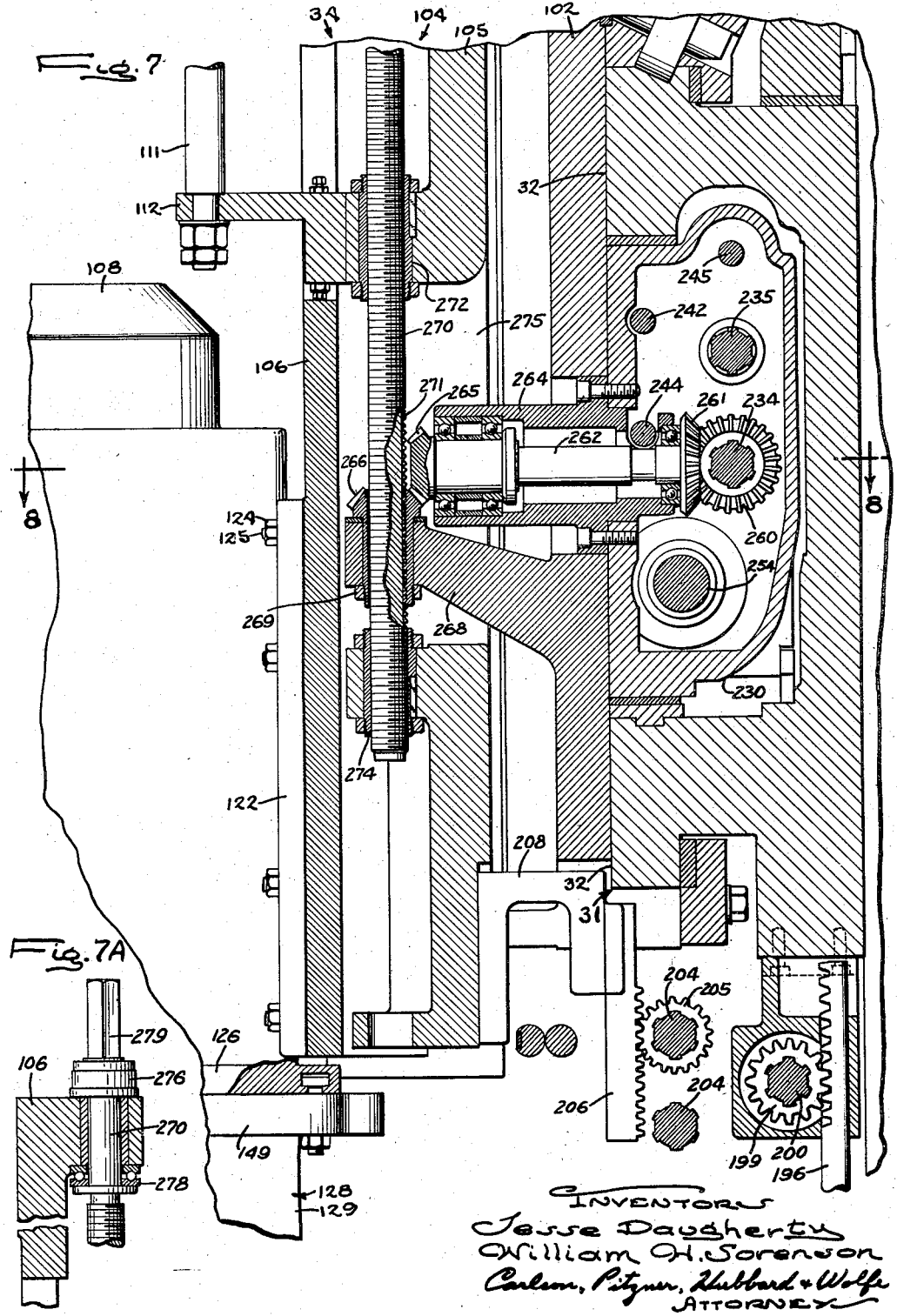
Fig. 7 is an enlarged fragmentary, sectional view taken vertically through the cross rail and the right-hand headstock, as indicated by the line 7—7 in Fig. 2.
Fig. 7A is a fragmentary, vertical, sectional view detailing the thrust connection between the positioning screw and the outer slide in the headstock shown in Fig. 7.

While the invention is susceptible of various modifications and alternative constructions, a preferred embodiment has been shown in the drawings and will be described below in considerable detail. It should be understood, however, that there is no intention to limit the invention to the specific form disclosed, but on the contrary, the intention is to cover all modifications and alternative constructions falling within the spirit and scope of the invention as expressed in the appended claims.

General machine organization

Upon more specific reference to the drawings, it will be perceived that the invention is there exemplified in an illustrative skin miller 21 built in the form of a large, high speed, planer-type milling machine. In general, such machine comprises a table for supporting a slab or plate workpiece and a column structure for supporting the milling headstocks. Relative movement between the column structure and table is provided to allow machining the full extent of an extremely long part such as a spar or wing panel. In addition to the foregoing, the spacing of the columns may be made sufficient to accommodate very wide panels, and the cross-rail may be made of such length, without sacrificing frame rigidity, as to permit the use of a plurality of headstocks for machining purposes. As illustrated more particularly in Figs. 1 and 2, the machine 21 is a table-type machine and comprises a bed 22 having protectively covered horizontal ways 24 which slidably support a table 25. The latter may be reciprocated longitudinally of the bed 22 and ways 24, as by means of an electronically controlled drive (not shown). Mounted on the table 25 for bodily movement therewith is a relatively short, box-like vacuum fixture 26 which holds a slab-shaped workpiece W for processing by the machine 21. Straddling the bed 22 and located at the central region thereof is a pair of spaced apart, upstanding columns 28, spanned by a transverse beam or "arch" 29. The front faces of the columns 28 are formed with vertical guideways 30 which are engaged by a cross rail 31 adapted to be traversed vertically along the ways 30. The front face of the cross rail 31 is provided with horizontally extending ways 32 having a plurality of individually driven headstocks 34, 35, 36 mounted thereon for horizontal traverse therealong. The headstocks 34 and 35, which might be referred to as the right hand and central headstocks, respectively, because of their relative locations as illustrated in Figs. 1 and 2, are adapted for vertical profiling operations, being equipped with appropriate cutters for this purpose. These two headstocks are also adapted to operate under tracer control. The headstock 36, which may be referred to as the left hand headstock, is adapted for profiling operations in a horizontal plane being provided with an appropriate cutter for this purpose. This headstock is adapted to operate under the control of an electrically actuated transfer device.

The headstocks 34, 25, 36 may be raised or lowered, at the option of the machine operator by means of push buttons or other controls incorporated into a fixed control panel 40 at the high hand end of the machine, as viewed in Figs. 1 and 2. Similar controls are also located on a movable control panel in the form of a pendant 41 which can be traversed laterally of the machine table in a direction parallel to the cross rail. Mechanical controls for power feeding of the headstocks along the ways 32 of the cross rail 31 are located at opposite ends of the latter.

For the purpose of accommodating various service and control lines or conduits carrying electricity, hydraulic pressure, cooling water, and compressed air to the headstocks 34, 35, 36 in a manner permitting them to be traversed along the cross rail without jeopardizing such lines, a multiple line feed device 42 is utilized. This device, which is described more fully in the copending application of Jesse Daugherty, Serial No. 238,295, filed July 24, 1951, comprises a beam-like housing 44 mounted on the cross rail 31 in vertically spaced, overlying relation therewith. The housing 44, which, for descriptive purposes, will be referred to as the feed reel housing, is of hollow box-like form and extends substantially the length of the cross rail, being secured thereto as by means of brackets 45. In addition to housing the various service and control lines for the headstocks, the feed reel housing 44 offers a convenient mounting for the fixed and the movable control panels 40, 41, at the same time accommodating the various line connections between them.

The feed reel housing 44 and the parts contained therein are suitably counterbalanced by means of weights 46A situated within the upright machine columns 28. These weights are fixed to cables 46 or other flexible tension elements trained over suitable sheaves within a pair of suspension brackets 48 which are mounted on the machine columns 28. From the suspension brackets 48, the counterweight cables 46 extend respectively to a pair of anchor brackets 49 fixed in spaced relation on the top of the feed reel housing 44.

As indicated in Figs. 1, 2 and 5, electric power is conducted to the feed reel housing 44 by means of one or more cables 50 entering the bottom of the fixed control panel 40 at the right-hand end of the housing 44. Cooling water and compressed air are also admitted to this end of the housing 44 by means of other lines or conduits not shown. Hydraulic power, which is required for the headstocks 34, 35 and 36, is furnished by means of a pump 51 driven by an electric motor 52, as indicated diagrammatically in Fig. 17. The motor 52 also drives a vacuum pump 54 which serves to drain the hydraulic system, the pump 54 discharging into a sump 55. These members are located at the left-hand end of the housing 44 and on the rear side thereof, although such location is not otherwise illustrated in the drawings.

Multiple line feed device

Turning now to the multiple line feed device 42 in greater detail, the structural aspects of the feed reel housing 44 will now be considered. In the present instance, the housing 44 is of generally L-shaped cross section, as shown in Fig. 3, being partitioned internally to define a plurality of longitudinal cmopartments adapted to house the respective groups of flexible service and control lines for the headstocks 34, 35 and 36, as well as the lines for the movable control panel 41. The housing 44 has a pair of laterally spaced compartments 58, 58A which receive the flexible service and control lines for the right-hand headstock 34. Superimposed upon the compartments 58, 58A is another pair of laterally spaced compartments 59, 59A which receive the lines for the center headstock 35. In like manner, a third pair of laterally spaced compartments 60, 60A is superimposed upon the compartments 59, 59A and accommodates the lines for the left-hand headstock 36. This tier-like arrangement of the various pairs of compartments defines within the feed reel housing 44 a central well 61 extending substantially the entire length of the housing. The compartments 58, 59, 60 are all of identical size and each contains a feed reel or take-up sheave 62 supported as by means of a floor plate 64. Similarly, the compartments 58A, 59A and 60A are also of identical size and each contains a feed reel or take-up sheave 65 supported as by means of a floor plate 66. Each of the feed reels 62, 65 is adapted to roll longitudinally of its particular compartment, being constrained against motion in any other direction by means of closely spaced compartment side walls having guide strips 68. The reels 62, 65 each have a series of grooves for receiving individually the flexible service and control lines which are fed to terminal points on the headstocks from fixed anchorages in the feed reel housing 44.

For the purpose of receiving its service and control lines from its individual feed reels, each of the headstocks 34, 35 and 36 is provided with suitable guide and support means extending into the central well 61 of the feed reel housing and also into its corresponding pair of feed reel compartments, the guide and support means being translatable bodily with its particular headstock (Figs. 3 and 4). Accordingly, the right-hand headstock 34 has an upright hollow stem or duct 69 rigidly mounted on a bracket 70 carried by the headstock. The duct 69 extends upwardly into the central well 61 of the housing 44 with sufficient side clearance to permit longitudinal movement therein, ultimately terminating in a laterally extending tray 71 which projects into both of the reel compartments 58, 58A. As indicated most clearly in Figs. 4 and 5, the tray 71 is of shallow, rectangular form, being disposed in proximity to the paths of its associated reels and preferably extending almost to the far wall of each of the compartments 58, 58A. In this instance, the floor 72 of the tray 71 is solid except for a flared rectangular aperture 74 defining the mouth of the duct 69. The side wall of the tray 71 closest to the feed reels 62, 65 has a plurality of spaced apart holes therethrough corresponding in size and spacing to the grooves on the reels 62, 65.

Referring in particular to Fig. 5, it will be noted that the flexible service and control lines or conduits for the right-hand headstock 34 originate in fixed anchorage points at the right-hand end of the feed reel housing 44 and extend along the floors of the feed reel compartments 58, 58A. Starting at the rear and coming forward, it will be perceived that the compartment 58A contains an air line 75, cooling water inlet and outlet lines 76, 78, hydraulic drain line 79, hydraulic pressure line 80 and hydraulic return line 81. All of the lines in this group are maintained in spaced apart parallel relation within the compartment 58A, being trained around individual grooves in the feed reel 65. From the latter, these lines extend through their corresponding holes in the side of the tray 71, being laid along the tray floor 72 and then downwardly into the duct 69 to the various terminal points on the headstock 34. Similarly, the compartment 58 contains flexible electric power leads 82, 83, 84, and an electrical control lead 85, all of the latter originating at terminal points located within the fixed control panel 40. The leads in this group extend in spaced apart parallel relation and are trained along individual grooves in the feed reel 62 Fig. 3, extending from the latter to the headstock 34 via the tray 71 and the duct 69.

The flexible lines or conduits for the headstock 34 and its feed reels 62, 65 are maintained under proper tension at all times by the use of a tensioning mechanism similar to that disclosed in Patent No. 2,395,485, issued February 26, 1946 to Gordon H. Jones. In this instance, such mechanism comprises two pairs of laterally spaced cables 86 fastened at one end to resilient anchor fittings 88 at the left end of the housing 44 and trained around respective ones of the feed reels 62, 65 Fig. 4, thence passing over fixed guide sheaves 89, 90 and finally leading back to anchor points on the side of the tray 71 remote from the feed reels 62, 65. By reason of such arrangement, a linear displacement of the headstock 34, including its duct 69 and tray 71, along the cross rail will cause its feed reels 62, 65 to roll along their respective compartment floors and effect a linear displacement equal to half that of the headstock 34. This results in the paying out of the taking up of slack in the flexible lines at precisely the proper rate to avoid drag on the headstock, maintaining such lines under the desired tension at all times within the limits of translational movement of the headstock. The arrangement is not affected by vertical displacements of the movable headstock elements since these displacements are compensated for by a moderate amount of slack in the lower ends of the lines coming out of the duct 69.

The remaining headstocks 35, 36 receive their service and control lines from their particular feed reels 62, 65 in a manner similar to that just outlined for the headstock 34. Thus the center headstock 35 has mounted on its bracket element 70 a duct 91 somewhat higher than the duct 69 but otherwise similar to it. The duct 91 terminates at its upper end in a tray 71 which reaches into the compartments 59, 59A containing the lines for the headstock 35. These lines originate at the right-hand or inlet end of the feed reel housing 44 but lead leftwardly across the entire feed reel housing via a fixed duct 92 at the front of the housing 44 (Fig. 3) eventually entering the left-hand ends of the compartments 59, 59A. Such lines are thereupon trained around the feed reels 62, 65 and into the tray 71 in the same manner as the lines for the headstock 34. The left-hand headstock 36 carries an upstanding duct 94 similar to the ducts 69, 91 but of still greater height (Figs. 3 and 4). The duct 94 also terminates in a tray 71 which reaches into the compartments 60, 60A and receives the flexible lines for the headstock 36 from the feed reels in a manner similar to that already described. These lines, like the lines for the headstock 34, enter the compartments 60, 60A directly from the inlet or right-hand end of the housing 44. Since the feed reels 62, 65 for the headstocks 35, 36 are each tensioned by a mechanism identical with that described for the feed reels of the headstock 34, a further description of such mechanism is unnecessary.

In addition to the compartments for the headstock feed reels, the housing 44 includes an additional reel compartment 95 which runs along its lower front portion (Fig. 3). The compartment 95 houses a feel reel 96 having the flexible electric lines or cables 98 for the slidable control panel or pendant 41 trained thereover (Fig. 5). The feed reel 96 is tensioned in a manner similar to that just described for the other feed reels and is adapted to roll longitudinally of the compartment floor to pay out or take up slack in the flexible lines 98 in accordance with horizontal linear displacements of the control pendant 41. As indicated in Fig. 5, these lines extend from the fixed control panel 40 at the right-hand end of the feed reel housing to a horizontal support such as tray 99 which projects into the compartment 95 from head 100 of the pendant 69 (see Fig. 3). The head 100 is adapted to slide along guideways 101 supported on the outside edge of its reel compartment and extending longitudinally of the feed reel housing (Figs. 2 and 3).

*Vertical profiling headstocks*

Figs. 6, 7, 8 and 11 illustrate the salient structural features of the right-hand and center headstocks 34, 35, which are used for vertical profiling. Since these two headstocks are substantially identical, like parts in each will be designated by common reference numerals. Accordingly, each of the headstocks 34, 35 comprises a saddle 102 slidably mounted on the ways 32 of the cross rail 31 and adapted to be traversed longitudinally thereof. Each saddle 102 carries a dual slide assembly 104 which adapts each headstock for rapid vertical adjustment of its cutters and also for tracer control operation. The dual slide assembly 104 on each saddle includes a vertically movable inner slide 105 which, in turn, carries a vertically movable outer slide 106 serving as a mounting for a headstock driving motor 108 and a cutter head. Each of the outer slides 106 can be raised or lowered relative to the inner slide by means of a mechanical power take-off from the cross rail 31 or by local manual means. In addition, each outer slide 106 is suitably counterbalanced as by means of an air cylinder 109 having its body fastened to the slide 106 as by means of bolts 110. The cylinder 109 has a depending piston rod 111 secured at its lower end to a forwardly projecting bracket 112 fixed to the inner slide 105 (Figs. 6, 7 and 11). To insure accurate maintenance of cutter position, each slide 106 is slightly over-counterbalanced by its air cylinder 109.

Each of the inner slides 105, on the other hand, has a hydraulic actuator 114 mechanically interposed between itself and the saddle 102. In the present instance, the body of the actuator 114 is rigidly fixed to the upper portion of the inner slide 105 and the depending piston rod 115 of the actuator is rigidly secured, as by means of nuts 116, to the upper portion of the saddle 102. The actuator 114 is adapted to impart a rise and fall movement to the inner slide 105 incident to tracer control operation. During such rise and fall movement, the outer slide 106, the motor 108 and the cutter head of each headstock all move bodily with the inner slide 105. In order to insure accuracy and freedom of movement in tracer control machining, the inner or "rise and fall" slide 105 is provided with appropriate vertical guide means which engage complemental guide means on the saddle 102. Preferably, the slide 105 and saddle 102 are formed with substantially square guides 117 and double gibs 118, the bearing surfaces between the slide 105 and the saddle 102 being lined with non-metallic laminates to minimize friction. The weight of the inner slide and all the parts movable therewith is precisely counter-balanced by a series of relatively long tensile springs 119 interposed between upstanding bracket 70 carried by the saddle and a pair of laterally projecting lugs 120 fixed to a plate 121 at the bottom of the inner slide 105 (Figs. 1, 2, 6 and 8). Since the length of the springs 119 is many times greater than the displacement of the slide 105 during its rise and fall movement, the counterbalancing force exerted on the slide 105 and the members moving bodily therewith is maintained relatively constant. The foregoing guiding and counterbalancing arrangement effectively eliminates stick slip and binding characteristics.

The individual drive motors 108 of the right-hand and center headstocks 34, 35 are of the high speed type and are susceptible of being operated at various speeds dictated by the requirements of particular cutting operations. Preferably, the motors 108 are water cooled, alternating current machines which provide a wide range of spindle speeds when operated from a power source of controllable and variable frequency. As shown most clearly in Figs. 6, 7, 8 and 11, each of the motors 108 has a mounting flange 122 attached directly to the front face of the outer slide 106, as by means of nuts 124 and studs 125.

At its lower end, the casing of each motor 108 terminates in a circular mounting flange 126 which carries a cutter head in the form of a right angle milling attachment 128 (Figs. 11, 12, 13 and 14). Such attachment comprises a gear box 129 abuttingly secured against the bottom of the circular mounting flange 126 and having a horizontal arm 130 projecting outwardly therefrom. Journaled in antifriction bearings 131 within the gear box 129 is a horizontal spindle 132, the latter having a small diameter pinion 133 driven at the speed of the motor 108 by means of a motor shaft pinion 134 and an intermediate drive gear 135 (see Fig. 14). The gear 135 in this instance comprises an integral body journaled on an appropriate shaft and having a set of spur or helical teeth meshing with the pinion 133 as well as a set of bevel teeth meshing with the bevel pinion 134. The horizontal spindle 132 terminates at its outer end in a nose 136 having a tapered socket 138 running axially thereof. The socket 138 drivingly receives the tapered end of an arbor 139 having one or more cutters 140 of relatively small diameter axially spaced thereon. The arbor 139 may be positively coupled to the spindle collar 136 as by means of a key 141. Outboard support for the arbor 139 and the cutters 140 is provided by means of a bearing block 142 having an antifriction bearing 144. By the use of a dovetail groove 145 in the bearing block 142 and a dovetail guide 146 on the horizontal arm 130, the bearing block 142 may be shiftably positioned axially of the arm 130 to allow insertion of the arbor 139 or to accommodate arbors of different length.

In order to permit the use of relatively small diameter cutters, the diameter of the pinion 133 is held to a minimum and the bottom of the gear box 129 under the pinion 133 is closed by means of a sheet metal plate 148 having only a slight clearance with the teeth of this pinion (Figs. 13 and 14). The gears within the box 129 are subjected to mist lubrication rather than to more conventional methods of lubrication.

Each right angle milling attachment 128 is adapted for free swivel movement in a horizontal plane through an angle of 360° about the motor spindle axis, the mounting flange 149 on top of the gear box 129 or the mounting flange 126 on the motor casing being formed with a circular T-slot for this purpose. The attachment 128 may conveniently be retained in a desired position of swivel adjustment at 90° intervals as by means of a locking pin 150 carried by a bracket 151 on the motor casing (Figs. 6 and 11). The depending end of the pin 150 engages an appropriate hole 152 in one of a plurality of locating lugs 154 projecting outwardly from the flange 149.

The arrangement just described permits milling of the workpiece W longitudinally of the table, using the table feed, with close end to end spacing of the milling attachments 128 and cutters of both of the headstocks 34 and 35 (Fig. 2). This is made possible in large measure due to the fact that the cutters 140 are offset axially from the vertical axis of their associated motor spindle. The arrangement alternatively permits cross milling operations transverse to the longitudinal axis of the table, using headstock feed on the cross rail 31. During cross milling, one of the headstocks 34, 35 and its milling attachment 128 follows the other, the leading headstock in each case carrying the roughing cutters and the following headstock the finishing cutters (see Fig. 12).

Upon more specific reference to Figs. 11 and 12, it will be perceived that the horizontal axis of the spindle and arbor in each horizontal milling attachment 128 is offset longitudinally of the cross rail from the vertical axis of the motor spindle by a considerable amount, indicated at "O" in Fig. 12. In addition, it will also be noted that the milling attachments 128 are of opposite hand insofar as the location of their arms 130 is concerned. Thus when the milling attachments 128 are swivelled toward each other into the positions illustrated in Fig. 12 for cross milling, it becomes possible to bring the leading and trailing cutter gangs of the headstocks 34, 35 relatively close together. This results in a substantial decrease in the length required in the cross rail 31 since the leading headstock need only be traversed beyond the end of its roughing cut by an amount equal to the relatively short center to center distance D between the leading and trailing cutter gangs in order to effect completion of the finishing cut by the trailing headstock.

In order to facilitate handling of the large volume of chips produced when the cutters 140 are milling material such as aluminum at high speeds, each of the milling attachments 128 may be equipped with an open-ended, box-like chip deflector 155 having an inclined floor which terminates in a hinged ramp 156 at its lower end. The free edge of the ramp 156 may be suitably slotted to conform to the contour of the newly milled workpiece W and rides thereon in close proximity to the cutters 140 (Fig. 14).

*Tracer control for vertical profiling headstocks*

Figure 15:
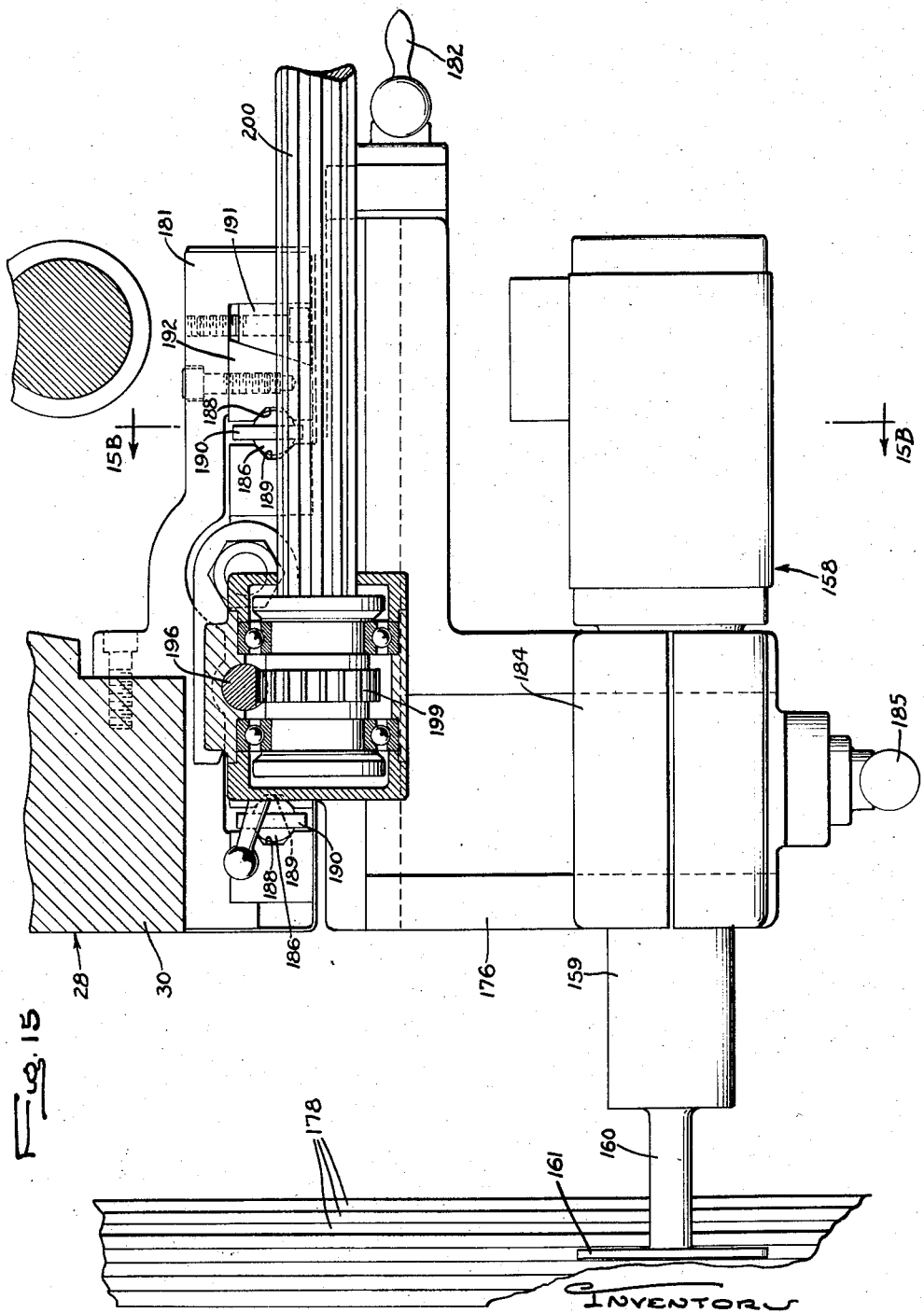
Fig. 15 is an enlarged horizontal sectional view through one of the tracer slide follow-up mechanisms, as indicated by the line 15—15 in Fig. 2, and showing one of the tracer slides in plan.

Tracer control operation of the vertical profiling headstocks 34, 35 is effected in the present instance by means of a pair of cam actuated hydraulic tracer control valves 158, one for each headstock (Figs. 5, 15 and 17). In general, each of the valves 158 comprises a body 159 having a stylus rod 160 and terminating in a semi-circular stylus disk 161 adapted to follow a suitable profiling cam. Each valve has connected therewith a hydraulic pressure conduit 162, a hydraulic return conduit 164, a hydraulic drain conduit 165, and a pair of hydraulic control conduits 166, 168 which ultimately communicate with the control conduits 166A, 168A leading to the hydraulic actuator 114 of its associated headstock (Figs. 6 and 17). In the present instance an air line and an electrical line also extend from the body of the valve 158 but these two lines need not be further considered for present purposes. To adapt each tracer control valve 158 for ready transfer between alternate stations, each such valve has associated therewith a detachable manifold in the form of a transfer plate 169 connected to the valve body 159 by means of a plurality of short, flexible jumper conduits.

For cross milling operation of each headstock 34, 35, in tracer control, its corresponding tracer control valve 158 is adapted for adjustable mounting directly upon its respective inner or rise and fall slide 105, as by means of a bracket 170 (Fig. 4). In this location the stylus disk of each valve 158 is actuated, as the headstock traverses the cross rail, by any one of a series of profile cams 171 supported from an upstanding plate 172 on the cross rail 31. As indicated in Figs. 4 and 6, the cams 171 are arranged in a package which rests upon and is fixed to a plurality of brackets 174 mounted in longitudinally spaced relation along the plate 172 of the cross rail. When the valve 158 is mounted for operation in this position, its transfer plate 169 is detachably secured to a fixed manifold plate 175 serving as the terminal point for the hydraulic lines coming out of the ducts 69, 91 of the headstocks.

For tracer control operation when milling parallel to the longitudinal axis of the table, provision is made for locating each of the control valves 158 in an operating station remote from its associated headstock 34, 35, with a novel follow-up mechanism mechanically interconnecting each valve 158 for simultaneous rise and fall movement with the slide 105 which it controls. Accordingly, each valve 158 may be detachably supported on a respective one of a pair of brackets 176, the latter being mounted on the front faces of the machine columns 28 in straddling relation with the table 25 (Figs. 2, 15, 16 and 17). In their remote operating stations on respective ones of the brackets 176, the tracer control valves 158 may each be actuated by any one of a series of profile cams 178 which engage their corresponding stylus disks 161. The cams 178 run longitudinally of the machine table 25 and are arranged in two "packages" carried by brackets 179 mounted in longitudinally spaced relation on opposite sides of the table (Figs. 2 and 15).

For a more detailed description of the novel follow-up mechanisms which permit remote station operation of their associated valves 158, reference should be had to Figs. 15, 15A, 15B and 16. In view of the substantial identity between such mechanisms, a complete description of the one connected with the right-hand headstock 34 will also suffice for the one connected with the center headstock 35. Like reference characters will be used to designate like parts in both mechanisms. Referring to Fig. 16, the follow-up mechanism for the headstock 34 is shown comprising a vertically movable tracer slide 180 supported on a fixed saddle 181 and connected with the inner slide 105 of the headstock for simultaneous rise and fall movement therewith. The saddle 181 is attached directly to a respective one of the machine columns 28 (Fig. 15). The slide 180 carries the valve support bracket 176 so that the latter is susceptible of adjustment transversely of the machine table 25 as by means of an adjusting handle 182. In addition, holding block 184 carrying the valve 158 is adapted for adjustment longitudinally of the machine table 25, as by means of adjusting handle 185.

Figure 15A:
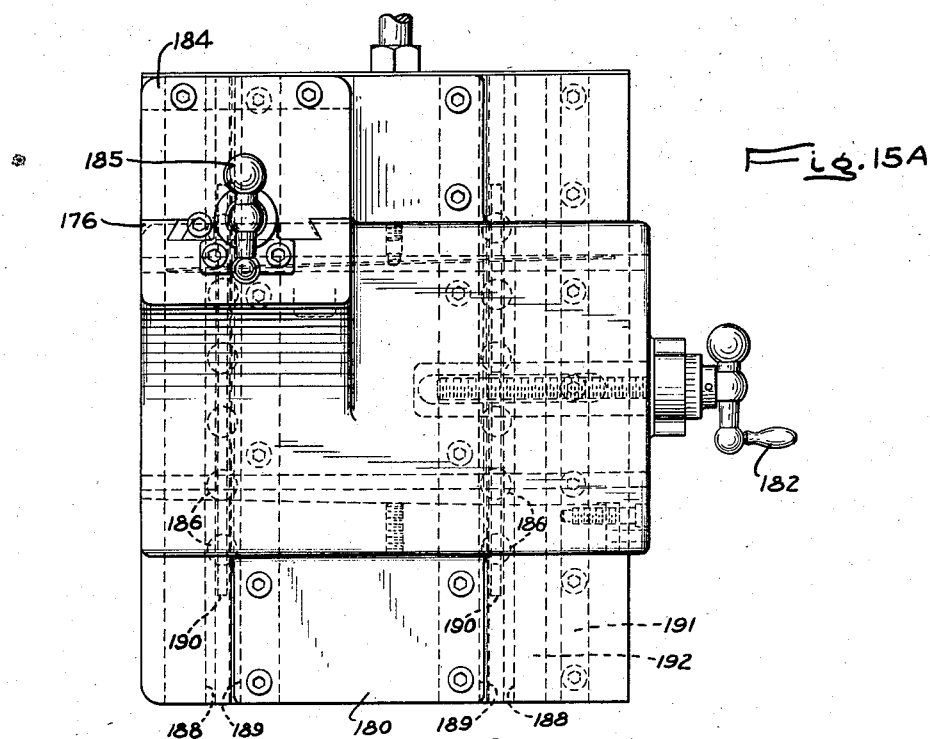
Fig. 15A is an enlarged front elevation of one of the tracer slides.
Figure 15B:
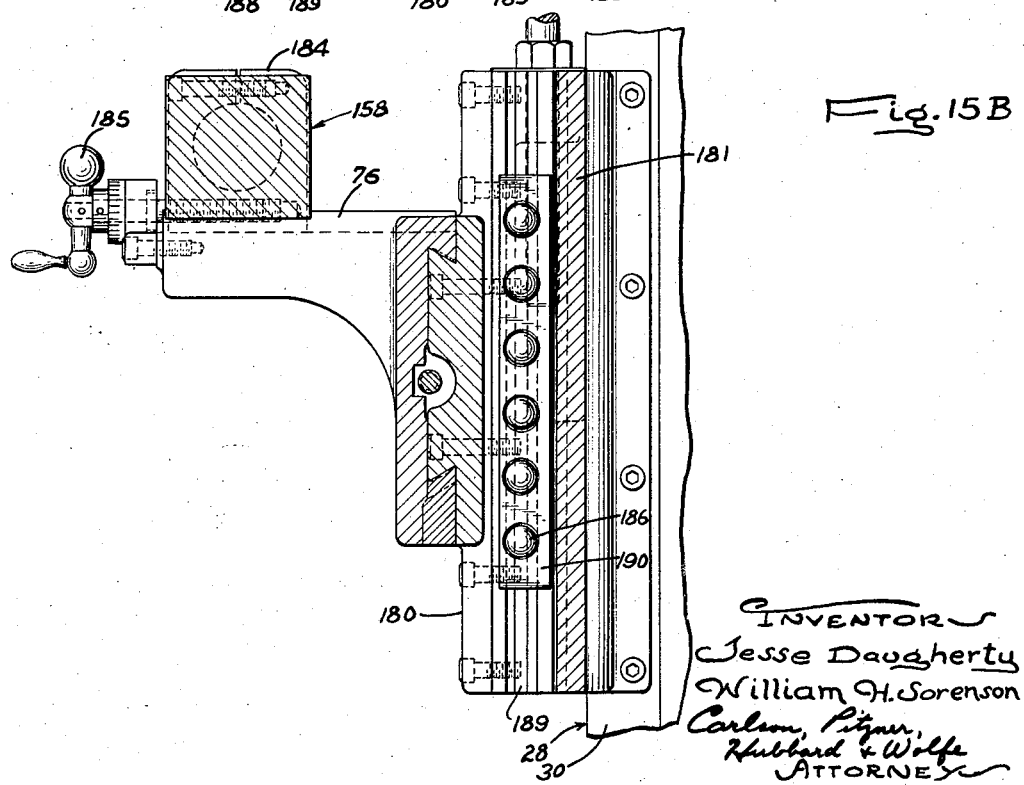
Fig. 15B is an enlarged vertical sectional view through the tracer slide of Fig. 15A, taken in the plane of the line 15B—15B in Fig. 15.

Friction between each of the slides 180 and its saddle 181 is drastically minimized in the present instance by the use of a plurality of sets of ball elements 186 disposed between grooved ways 188, 189 on the slide and saddle, respectively (Figs. 15, 15A and 15B). Each set of ball elements may be confined within a spacer 190 and the lateral play may be taken up by an adjustable wedge 191 which bears against one of the way blocks 192 (Fig. 15).

Rigidly fixed to the slide 180 is a short, upstanding pin 193 which terminates at an arm 194. The latter is adjustably secured, as by the use of clamping screw 195, to an upright bar 196 having a series of rack teeth 198 adjacent its upper end. The teeth 198 of the bar mesh with a pinion 199 fixed to one end of a shaft 200 which is journaled in the cross rail 31. At its opposite end, the shaft 200 has fixed thereto a pinion 201 meshing with another pinion 202, the latter being fixed to a splined countershaft 204 also journaled in the cross rail. Drivingly mounted on the splined countershaft 204, but slidable therealong, is a pinion 205 meshing with a rack 206. The latter is rigidly fixed to a heavy bracket 208 which is securely fixed on the lower portion of the headstock rise and fall slide 105 (Figs. 7 and 16).

In order to keep the load on the follow-up drive at a minimum, the tracer slide 180 may be made of relatively light metal, such as aluminum. In addition, the drive may be counterbalanced as by the use of a tensile spring 209 fastened at one end to an extension 210 of the arm 194 and at its opposite end to an anchorage 211 on the machine column 28. The tracer slide assembly is not completely counterbalanced, however, because the unbalanced portion of its weight is utilized to maintain a unidirectional loading torque on the drive. Consequently, backlash in the gearing and other connections does not affect the sensitivity of the response of the tracer slide 180 to the headstock rise and fall slide 105 which moves the cutters. By using the antifriction bearings between the tracer slide 180 and its saddle 181, the torque required to rotate the shafts 200, 204 is minimized, thereby minimizing torsional deflection or "wind-up." Such deflection is further minimized by making the shafts heavy in proportion to the torque transmitted.

The operation of the follow-up drive will undoubtedly be clear at this point to those skilled in the art. Briefly, when the tracer control valve 158 is in its remote operating station on the tracer slide 180, the valve stylus disk 161 rides on one of the profile cams 178 on the side of the machine table. Upon deflection of the valve stylus 160 from neutral due to the contour of the cam 178, the valve 158 serves to admit or withdraw a proportional increment of hydraulic fluid from the actuator 114 of the rise and fall slide 105 at the headstock 35, causing the cutters to follow the cam 178. At the same time, such movement of the slide 105 effects a corresponding movement of the tracer slide 180 in the proper direction to return the valve stylus 160 to neutral.

Each tracer control valve 158 may also be utilized to provide a rapid means for effecting cutter retraction. Thus by providing a suitable manual control such as a push button switch on either or both control panels 40, 41, the plunger of the valve 158 may be almost instantaneously shifted to a point where it causes admission or discharge of hydraulic fluid from its associated actuator 114 so as to retract from the workpiece W the rise and fall slide 105 and the cutters supported thereon.

To afford a mounting for the hydraulic connections and transfer plate 169 of each tracer control valve 158 when in its remote or "table" operating station, the cross rail 31 has a pair of depending brackets 212, one such bracket being located in the vicinity of each machine column 28 (Figs. 1, 2 and 5). Each of the brackets 212 terminates in a fixed manifold in the form of a plate 214, the latter being adapted to receive the valve transfer plate 169 in sealed, abutting relation therewith. Each fixed manifold plate 214 connects with main hydraulic pressure and return lines 216, 218, as well as with main hydraulic drain line 219, as indicated in Fig. 17. In addition, each fixed manifold plate 214 connects with a corresponding pair of hydraulic conduits 220, 221 which lead to a respective one of the headstocks 34, 35 via one of the feed reels 65. A branch of the main hydraulic drain line 219, designated by the reference numeral 219A, also leads to each of the headstocks 34, 35 via one of the feed reels 65, along with the lines 220, 221. A set comprising these three lines terminates at the fixed manifold plate 175 located on each headstock 34, 35 at the base of its upright duct.

By reason of the foregoing connections, it will be noted that the two pairs of lines 220, 221 extending between the fixed manifold plates 214, 175 and leading over the respective feed reels 65 of the headstocks 34, 35 serve as control lines when their respective tracer control valve occupies its remote station adjacent the table. As control lines, the conduits 220, 221 communicate between the jumper control lines 166, 168 attached to the tracer control valve and the jumper control conduits 166A, 168A, attached to the hydraulic actuator 114 on their associated headstock (Fig. 17). On the other hand, when the valve 158 is situated in its alternative operating station on the headstock, the jumper control lines 166, 168 attached to the valve 158 communicate directly with the jumper control conduits 166A, 168A of the actuator 114 via the transfer plate 169 and the fixed manifold plate 175 on the headstock. This makes it possible to utilize the lines 220, 221, which already extend over the feed reels 65, to connect the main hydraulic pressure and return lines 216, 218 with the pressure and return lines 166, 168 of the valve 158 on the headstock. Such connection may readily be effected by the use of an appropriate jumper manifold 222 adapted for attachment to the fixed manifold 214 at the base of each manifold bracket 212. The jumper manifold has appropriate passages to connect, at the manifold 214, the terminal ends of the conduits 216, 218 with the terminal ends of the conduits 220, 221, respectively (Fig. 17). In addition, the jumper manifold 222 also serves as a connection for the headstock ends of the lines 220, 221 and the jumper control conduits 168A, 166A when the tracer control valve is in its remote or "table" position. The jumper manifold 222 then registers with the manifold plate 175 on the headstock.

*Horizontal profiling headstock*

The remaining headstock 36, which may be referred to as the left-hand headstock, is designed primarily for face and profile milling operations. It has a motor 108 and a cutter (not shown), both mounted on a swivel head 224 which permits universal swivel movement through an angle on the order of 15° from the vertical (Figs. 1 and 2). The head 224 is also equipped with a truss-like swivel arm 225 (Fig. 1) carrying an electric tracer unit 226 for profiling in a horizontal plane. By means of appropriate electric controls, the tracer unit enables the headstock 36 to profile mill a workpiece on one portion of the table by tracing a templet mounted on another portion of the table. The headstock 36 also includes a saddle 102A, slidable on the cross rail, and which supports a slide 105A somewhat similar in form to the rise and fall slides 105 of the other headstocks. The slide 105A and its saddle 102A are connected mechanically by a hydraulic actuator (not shown) which, in turn, is controlled by means of a solenoid valve. The actuator in this instance is not used for rise and fall contouring but rather as a convenient means for rapidly positioning the profiling tool for an initial cut or for rapidly retracting the tool from a finished cut. The vertically movable elements of the headstock 36 are also counterbalanced as by means of springs 119 similar to the counterbalancing springs of the other headstocks.

*Headstock feed drive*

The feed drive for the headstocks 34, 35 and 36 is assembled upon the machine cross rail 31. The drive permits power traverse or manual traverse of all three headstocks along the ways 32 of the cross rail. The headstocks 34, 35, 36 may be traversed along the cross rail individually, or, on the other hand, the right-hand and left-hand headstocks 34, 36 may be traversed selectively in unison with the central headstock 35. Simultaneous traverse of the right-hand and left-hand headstocks 34, 36 is, however, precluded. The feed drive also permits power elevation or depression, as well as manual elevation or depression, of the outer slides 106 of the vertical profiling headstocks 34, 35, and of outer slide 106A of the horizontal profiling headstock 36.

In general, the feed drive comprises an input transmission 228 (Figs. 18, 20 and 25) which, in this instance, is located on the right-hand end of the cross rail 31, being powered from any suitable source via a main drive gear 229. The feed drive also includes a headstock transmission 230 fixed to the saddle 102 of the right-hand headstock (Figs. 7 and 9) and a headstock transmission 231 fixed to the saddle 102 of the central headstock (Figs. 6 and 10). The horizontal profiling headstock 36 also carries a headstock transmission 232 (Fig. 25) which is not shown in detail since it is substantially identical with the transmission 230 of the right-hand headstock. The input transmission 228 and the headstock transmissions 230, 231, 232 are connected by means of a plurality of power shafts and control rods having slidable connections with the latter. These members include a first drive shaft 234 and a second drive shaft 235 both of splined form and which run longitudinally of the cross rail, being journaled in appropriate bearings therein. The shafts 234, 235 are adapted to receive driving power from the input transmission 228 through driving pinions 236 and 238, respectively, connected as by means of intermediate gears 239, 240 with a power input gear 229 (Figs. 18 and 25) which may be driven by a reversible motor. Operatively associated with the drive shafts 234, 235 are a shifter rod 241 for selectively operating the headstock transmissions 230, 232, of the right-hand and left-hand headstocks, a shifter rod 242 alined with the rod 241 for operating the transmission 230 of the right-hand headstock, a shifter rod 244 for operating the transmission 231 of the center headstock, and a shifter rod 245 for operating the transmission 232 of the left-hand headstock (Fig. 25).

Considering more particularly the feed drive connections for the transmission 230 of the right-hand headstock 34, and which is also typical of the feed drive connections for the left-hand headstock 36, it will be noted upon reference to Fig. 9 that such transmission is slidable relative to its control rod 242 and the power shafts 234, 235. The transmission 230 receives its driving torque from the shaft 235, as by means of a toothed, shiftable clutch element 246 splined or otherwise keyed to the shaft 235. Adjacent opposite ends of the clutch element 246 are a pinion 248 and a pinion 249, both journaled on the power shaft 235 and being selectively engageable by the shiftable clutch element 246. The pinion 248 meshes with an idler pinion 250 journaled on the shaft 234, the pinion 250, in turn, meshing with a gear 251 drivingly secured to a torque sleeve 252. The latter is journaled in the supporting frame of the headstock transmission 230 and surrounds a stationary traversing screw shaft 254 running the length of the cross rail 31. The sleeve 252 is connected with the stationary screw shaft 254 as by means of double nut elements 255 which are both adjustable to take up back lash. By reason of the connections just described, when the clutch element 246 is shifted into engagement with the pinion 248, a driving torque can be transmitted from the drive shaft 235 to the nut elements 255 via the element 246, gears 248, 250, 251 and the torque sleeve 252. This causes the right-hand headstock 34 to traverse along the stationary screw shaft 254 of the cross rail in either direction, depending upon the direction of rotation of the drive shaft 235.

Turning now to the power take-off of the transmission 230 and which moves the outer slide 106 of the headstock 34 vertically, it will be noted that it is necessary to "come through" the inner or rise and fall slide 105 without interfering with its operation. This is accomplished in an ingenious and straightforward manner, as indicated in Figs. 7 and 9. Accordingly, the pinion 249 is disposed in meshing engagement with a gear 256 journaled on the shaft 234 and separated from the pinion 250 by means of a spacer 258. The gear 256 is fixed to a sleeve 259 journalled in surrounding relation with the shaft 234 and terminating in a bevel portion 260 (Fig. 9). The latter meshes with a similar bevel pinion 261 fixed to a stub shaft 262 which is perpendicular to the shaft 234, being journaled within a fixed sleeve 264 projecting forwardly from the saddle 102. At its forward end, the stub shaft 262 terminates in a bevel pinion 265 which meshes with another bevel pinion 266 having a depending sleeve thereon and journaled in a bracket 268 which projects forwardly from the saddle 102. The pinion 266 is mounted on the bracket 268 for rotation about an upright axis, being retained in position as by means of a collar 269. Drivingly keyed within an axial bore in the pinion 266, but slidable relative to such bore, is a threaded positioning shaft 270 having a keyway 271 running almost its entire length. The positioning shaft 270 is disposed in threaded engagement with a pair of stationary nuts 272, 274 fixed respectively to the rise and fall slide 105 above and below a clearance opening 275 provided in the slide 105 for the projecting sleeve and bracket 264, 268. At its upper end, the positioning shaft 270 is rotatably secured to the outer slide 106 by means of thrust collar and bearing elements 276, 278 (Fig. 7A). The upper end of the shaft 270 also has an upstanding tang 279 (similarly shown in Fig. 7A) for engagement by a manual adjusting tool.

By reason of the mechanical connections just described, when the clutch element 246 (Fig. 9) engages the pinion 249, a driving torque may be transmitted from the shaft 235 to the pinion 266 via the members 249, 256, 259, 260, 261, 262, and 265. Such torque effects rotation of the pinion 266 and causes the positioning shaft 270 to move axially relative to the fixed nuts 272, 274 on the rise and fall slide 105. The axial movement of the positioning shaft 270 is accompanied by a corresponding vertical shift of the outer slide 106 relative to the inner slide 105, raising or lowering the cutter head 128 and the cutters 140, depending upon the direction of rotation of the drive shaft 235.

Referring next to the feed drive transmission 231 of the center headstock 35, Figs. 6, 10 and 25 show such transmission to be slidably disposed relative to the control rods 242, 244, 245 and the drive shafts 234, 235 in the cross rail. The transmission 231 is driven from the shaft 234, as by means of a shiftable clutch element 280 drivingly secured thereon. When engaging a pinion 281 freely journaled on the shaft 234, the clutch element 280 is adapted to transmit a driving torque from the shaft 234 via the pinion 281, a gear 282, and a torque sleeve 284 to a pair of double nut elements 285 which engage the stationary traversing screw shaft 254. These connections, of course, impart a traversing movement to the headstock 35 in either direction longitudinally of the cross rail 31, depending upon the direction of rotation of the shaft 234. On the other hand, when the shiftable clutch element 280 engages a second clutch element 286 which is drivingly secured to a sleeve 288 journaled on the shaft 234, a bevel pinion 289 at the end of the sleeve 288 is rotated. The latter meshes with a bevel pinion 261 in a drive identical with that described in connection with the headstock 34, effecting a vertical displacement of the outer slide 106 and the cutters supported thereby via a stub shaft 262, beveled gears 265, 266, a vertical positioning screw 270, nuts 272, 274, and thrust elements 276, 278 (Fig. 6).

The feed drive transmission 232 and connections associated with the left-hand headstock 36 are arranged after the manner of those associated with the right-hand headstock 34 and need no detailed description. Briefly, as indicated in Fig. 25, the transmission 232 receives power from the drive shaft 235 by means of a shiftable clutch element 290 splined thereon. For traverse of the headstock 36 along the cross rail, the clutch element 290 is adapted to transmit power to torque sleeve 291 via gears 292, 294 and 295. For imparting vertical movement to the outer slide 106A of the headstock 36, the clutch element 290 is adapted to transmit power to a threaded position control shaft (not shown) similar to those already described for the other headstocks via a train of gears 296, 298, 299 and 261.

*Controls and interlocks for feed drive*

Having in mind the feed drive for the three headstocks 34, 35, 36, consideration may now be given to the controls for such drive. As indicated in Figs. 1, 2 and 25, these controls are accessible at opposite ends of the cross rail by means of a plurality of control levers mounted on respective ones of the control rods 241, 242, 244 and 245.

Starting with the control for the center headstock 35, it will be noted that the ends of the control rod 244 associated therewith project from the housings at the extremities of the cross rail and that each projecting rod end has a control lever 300 pinned or otherwise rigidly fixed thereto (Figs. 18, 19, 20 and 25). Where it passes through the transmission 231, the control rod 244 is slidably keyed to a pair of spaced apart, alined shifter cams 301 which coact with a double cam 302 interposed therebetween and freely journaled on the rod 244 (Fig. 10). Rigidly secured to the double cam 302 and axially movable therewith is a shifter yoke 304 which actuates the shiftable clutch element 280. Upon rotation of the rod 244 in a clockwise direction, as viewed from the right-hand end of the cross rail (Fig. 18), the double cam 302, yoke 304 and clutch element 280 are cammed to the right, and, upon application of a driving torque to the drive shaft 234, the outer slide 106 of the headstock 35 undergoes a vertical displacement in the manner already set forth above. On the other hand, rotation of the control rod 244 in a counterclockwise direction, as viewed in Fig. 18, forces the members 302, 304 and 280 to the left, completing the gear train required for traversing the headstock 35 along the cross rail upon the application of a driving torque to the drive shaft 234.

Provision is made for manual actuation of the feed drive for the center headstock 35, as well as power actuation thereof, with adequate interlocks between controls. Accordingly, either operating lever 300 of the control rod 244 is arranged to have two operative angular positions on either side of a middle, or neutral, position (Figs. 18 and 19). The first angular position of the lever 300 below its neutral position permits manual feeding of the headstock 35 along the cross rail. The second position of the lever 300 below neutral permits power feeding of the headstock 35 along the cross rail. On the other hand, the first angular position of the lever 300 above neutral permits the outer slide 106 of the headstock to be moved vertically by manual means. The second angular position of the lever 300 above neutral permits power shifting of the outer slide 106 in a vertical direction.

The foregoing is accomplished in a remarkably simple manner by precluding the application of power from the input transmission 228 to the drive shaft 234 when the levers 300 and their control rod 244 are in either of their manual positions while at the same time utilizing such manual positions to establish selectively a mechanical connection between the drive shaft 234 and the torque sleeve 284 which traverses the headstock, on the one hand, or between the drive shaft 234 and the pinion 289 which effects vertical displacement of the outer slide 106, on the other hand. Since the shifter cams 301 on the control rod 244 are each formed with a single camming step 305 on either side of neutral, shifting of either lever 300 to either of its manual positions will readily shift the coupling element 280 to select the desired driving connection (Fig. 10). Thus upon the application of a manual torque to the drive shaft 234, as by means of one or more ratchet-like levers 306 slidably mounted thereon, the headstock 35 may be shifted along the cross rail or its outer slide may be shifted vertically. Under these conditions, the drive gear 236 of the input transmission 228 cannot transmit power to the drive shaft 234. This is due to the fact that each one of a pair of shifter cams 308 fixed to the control rod 244 (Fig. 20) has a pair of angularly spaced camming steps 309, one such step being located on either side of neutral. Each pair of steps 309 is separated by a radial face 310 which contacts an adjacent tooth extremity of a sliding cam 311. Each radial face is of sufficient angular length to preclude axial sliding movement of the cam member 311 when the levers 300 and the control rod 244 are shifted in either direction from neutral into a manual position. By the same token, this prevents the sliding cam 311 and its shifter yoke 312 from effecting engagement between shiftable clutch element 314, splined to the drive shaft 234, and the drive gear 236, freely journaled on the shaft 234 (Figs. 20 and 25). However, when the levers 300 and control rod 244 are shifted from a manual to a power position, one of the cam steps 309 on each shifter cam 308 permits axial movement of the sliding cam and shifter yoke 311, 312 to the left (as shown in Figs. 20 and 25) engaging the clutch element 314 with the gear 236 and thereby effecting a power connection with the drive shaft 234. This in no way disturbs the shifted cam 302 within the headstock transmission 231, since the cams 301 then present radial faces 315, 316 to the ends of the cam 302 (Fig. 10).

Accidental feed-back of power from the drive shaft 234 to the manual operating levers 306 is prevented by the construction of the levers themselves. As shown in Fig. 21, each of the levers 306 contains a plunger 318 having a tapered nose 319 adapted for engagement with any one of the recesses between the teeth of a collar 320 splined to the shaft 234. The plunger 318 is maintained with its nose in a normally disengaged position, as by means of a biasing spring 321 and a detent 322. It can establish an operative connection between the lever 306 and the drive shaft 234 only during such time as a deliberate axial pressure is maintained on its head 324 tending to force the plunger toward the drive shaft 234.

Turning now to the controls for the right-hand and left-hand headstocks 34, 35, it will be seen that such controls are closely similar to those just described for the center headstock 35. Thus the right-hand headstock 34 may be operated from either end of the cross rail 31 by the use of a control lever 325 fixed to the control rod 241 and another control lever 326 fixed to the control rod 242 which is alined with the rod 241 (Figs. 18, 19, 20 and 25). These levers and control rods may be operated in unison by means of a pair of coupling pinions 328, 329 fixed to respective ones of the rods 241, 242, and a shiftable cluster gear 330 adapted to mesh with the pinions 328, 329 (Figs. 20 and 25). The levers 325, 326 and control rods 241, 242 have manual and power positions similar to those just described, the mechanical connections being effected by means of cams 331, 332, yoke 334 and shiftable clutch member 246 in the headstock transmission 230, and by cams 335, 336, yoke 338 and shiftable clutch member 339, within the input transmission 228. A manual torque may be applied to the drive shaft 235, which drivingly connects with the transmission of the right-hand headstock 34, as by means of one or more levers 306 similar to those already described.

The feed drive for the left-hand headstock 36 may readily be controlled from both ends of the cross rail 31 but is arranged for selective rather than simultaneous operation with the feed drive for the right-hand headstock. Accordingly, the left-hand end of the control rod 245 has fixed thereto an operating lever 340 (Figs. 19, 20) having normal and power positions similar to those of the control levers already described. The lever 340 and its control rod 245 operate mechanical connections within the headstock transmission 232 by shifting the clutch element 290 through a yoke 341 (Fig. 25). The lever 340 and its control rod 245 are adapted to be connected with the input transmission 228, to apply power to the drive shaft 235, via a pinion 342 fixed to the rod 245 and meshing with a toothed section 343 of the cluster gear 330, the latter being journaled on the end of a headstock selector plunger 344. Thus, when the headstock selector plunger 344 is in its inward position, as illustrated in Fig. 20, the lever 340 and control rod 245 are adapted to actuate the shifter cam elements 335, 336 by reason of their connection with the pinion 328 on the control rod 241. Conversely, the foregoing mechanical connections permit operation of the feed drive for the left-hand headstock 36 from the right-hand end of the cross rail 31 by means of the control lever 325 and its rod 241. Under these conditions, the control rod 242 and its operating lever 326 are disconnected from the control rod 241 since the pinion 329 does not then mesh with the cluster gear 330. When the headstock selector plunger 344 is pulled outwardly to its other position, the gear connection between the control rods 245, 241 is broken and simultaneously the connection between the rods 241, 242 is established via the cluster gear 330.

To insure that one of the levers 340, 326 and its respective control rod 245 or 242 will remain in neutral while the other lever and rod are being operated, and also to further preclude simultaneous operation of the right and left-hand feed drives via the levers 340, 326, an additional mechanical interlock is provided. In the present instance this interlock comprises a hardened steel pin 345 (Fig. 20) housed within a supporting block 346 and adapted to interfit with either one of a pair of recesses 348 in the peripheries of the respective control rods 242, 245. By reason of such structure, one of the control rods 242, 245 must be and remain in its neutral position if the other rod is shifted from a neutral position.

Upon reflection, it will be noted that the foregoing headstock feed drives and controls enable the cross rail 31 to accommodate a third headstock simply by adding an additional control rod to the drive and controls which would otherwise all be required for accommodating only two headstocks. This reduces the size, number of parts and complexity of the cross rail structure, and leads to decided advantages, both from the standpoint of manufacture and also from the standpoint of operation and maintenance.

*Rail shaft support brackets and interlocks*

In view of the substantial length of the shafts and control rods running longitudinally of the cross rail 31, provision is made for supporting these members in the vicinity of their mid-points regardless of the positions of the headstocks along the cross rail. If this were not done, the shafts and control rods would sag to an excessive extent under certain conditions such, for example, as when all three headstocks are positioned adjacent either extremity of the cross rail 31. Accordingly, the cross rail 31 is equipped with a plurality of rail shaft support brackets 350 disposed in alternate series relation with the headstocks, one such bracket being interposed between the center headstock 35 and the right-hand headstock 34, another between the center headstock 35 and the left-hand headstock 36, one outboard of the right-hand headstock 34 and still another one outboard of the left-hand headstock 36 (Fig. 2). As illustrated in Figs. 21 and 22, each of the brackets 350 is slidably secured to the ways 32 of the cross rail for movement longitudinally therealong. Each bracket 350 has suitable bushings (not shown in detail) for slidably supporting the drive shafts 234, 235, the control rods 242, 244 and 245, and the shafts 204 of the rise and fall follow-up mechanism. In this instance, the stationary feed screw shaft 254 receives no intermediate support but simply passes through clearance apertures 351 in the bracket structure. Since the shaft 254 does not rotate, there will be no tendency for this shaft to whip or cause binding in moving parts. Each of the brackets 350 also serves as a convenient mounting for the ratchet-type manual operating levers 306 for rotating the drive shafts 234, 235, the levers 306 projecting forwardly from the bracket through an offset slot 352.

Each bracket 350 is adapted to be detachably coupled to an adjacent one of the headstocks for movement therewith longitudinally of the cross rail. For this purpose, each of the brackets 350 has a pair of horizontally projecting wings 354. Each of the latter has mounted on its top side a latch element 355 having an undercut recess 356 therein. Adjacent each of its lateral extremities, each headstock is provided with a coacting latch element 358 fulcrumed on a pivot 359 and having a hook 360 at the end remote from the pivot. The latch element 358 is overbalanced by its own weight so as to cause the hook 360 to ride up a ramp 361 on the latch element 355 and drop into the recess 356. The element 358 is maintained in proper position for engagement of the member 355 by means of a mechanical stop 362 mounted on the headstock adjacent the pivot 359. Once the latch element 358 has engaged the element 355, the rail shaft support bracket 350 will readily be towed behind the headstock as the latter moves along the cross rail. Conversely, the headstock upon reversal of its movement will readily push the bracket 350 ahead of it. To preclude towing of the rail shaft support brackets 350 past the center of the cross rail 31 in either direction, the latter has fixed at its mid-point a release cam in the form of a block 364 having an inclined cam surface 365 tapering downwardly at either end. For coaction with the cam block 364, each cam element 358 is provided with a suitable follower which in this instance happens to be a follower roller 366. Thus as a headstock crosses the center of the cross rail with one of the brackets 350 in tow (Fig. 23), the follower roller 366 rides up the inclined surface 365 of the block 364. This raises the free end of the pivoted latch element 358, as shown in Fig. 24, and completely disengages the latter from the coacting latch element 355 on the support bracket, leaving the latter free at the middle of the cross rail.

To prevent two adjacent headstocks from simultaneously latching into engagement with the same rail shaft support bracket 350, with the likelihood of subjecting the latter to opposite tension forces with consequent damage to the machine, a relatively simple interlock is incorporated into each of the brackets 350. As shown in Figs. 22 to 24, this interlock simply comprises a hardened plunger element 367 having a longitudinal dimension somewhat greater than the width of the bracket 350 measured along the cross rail. If the bracket is equipped with headstock bumper abutments 368, the length of the plunger 367 is in excess of the distance between the outer extremities of the bumper abutments. The plunger 367 is disposed for limited sliding movement within a bore 369 of the bracket 350, being retained in position as by means of a set screw 370. The length of the plunger 367 is such that it simply prevents the two headstocks from getting sufficiently close together to permit their latch elements 358 to engage both latch elements 355 of the bracket 350 simultaneously. In other words, the plunger 367 is long enough to prevent adjacent headstocks from approaching the bracket 350 so closely that the distance between the free edges of the latching faces of their latch hooks 360 equals or becomes less than the distance between the free edges of the undercut latching faces on the bracket latches 355.

*Ancillary features*

In addition to the features already described herein, the illustrative skin miller 21 also includes certain ancillary features which might be noted in passing although the present invention is not primarily concerned with them. For example, Fig. 1 illustrates a rolling bridge 372 which spans the machine table 25 and the bed 22. The bridge 372 has a catwalk substantially coextensive in length with that of the cross rail 31. By rolling the bridge 372 into a position directly over the table and close to the cutting heads, the operator is enabled to maintain efficient control of the machine 21 through the various shift levers on the cross rail and also by means of the movable control pendant 41.

The machine table 25 is preferably equipped with an electronically controlled drive which is adapted to feed and traverse the table over an extremely wide range of speeds in infinitely variable increments. In like manner, the drive to the input transmission 228 of the cross rail is also susceptible of infinitely variable speed, between the same limits as those for the table drive. In addition to the electrical controls provided for the foregoing speed ranges, the table and headstock feed drives also include a plurality of different mechanical ratios which are selectively available. A further feature of the table drive resides in the provision of a magnetic multiple disk brake (not shown) which is used to provide a positive table lock during cross milling operations. Electrically operated clamps are also provided to bind the cross rail 31 to the machine columns 28. These are interlocked with the cross rail elevating means so that the cross rail 31 cannot be moved when clamped.

For longitudinal and cross positioning of any one cutter head or combination of cutter heads, the machine 21 is equipped with a plurality of finely calibrated, direct reading gauges. These greatly facilitate precision setting of the cutter heads and table.

We claim as our invention:
1. A planer-type milling machine comprising the combination of a bed, a table mounted for horizontal reciprocation on said bed, a pair of upright machine columns straddling said bed, each said column having vertical guideways thereon, a cross rail spanning said columns and positionable vertically along the guideways thereof, said cross rail having horizontal guideways along its front face, a pair of vertical profiling headstocks mounted on said cross rail for sliding movement longitudinally of the guideways thereon, each said headstock having an inner slide carrying a vertically movable outer slide, an actuator for said inner slide, an individually powered cutter head fixed to said outer slide, support means fixed to each said inner slide and adapted to carry a tracer control device for governing the actuator of said inner slide by means of one or more profile cams mounted on said cross rail, remote support means slidably secured to said machine columns, each remote support means being adapted to carry a tracer control device operated by one or more profile cams mounted on said table, a connection interposed between each said tracer control slide and a corresponding one of said headstocks, and a multiple line feed device fixed to said cross rail in overlying relation with the same for feeding a plurality of flexible service and control lines to said headstocks, certain of said lines connecting terminal points adjacent said tracer control support means on each said inner slide with terminal points adjacent a corresponding one of said remote support means for said tracer control device.

2. A planer-type skin miller for machining metal plates and the like, said skin miller comprising, in combination, a bed, a table reciprocable on said bed, a pair of upstanding columns straddling said bed, a cross beam assembly including a cross rail and a housing overhanging the cross rail spanning said columns with its ends overhanging beyond the lateral edges of said table, a vertical profiling headstock slidably secured to said cross rail for movement therealong, a horizontal profiling headstock slidably mounted on said cross rail and located between one end thereof and said vertical profiling headstock, said horizontal profiling headstock including a swivel adjustment about perpendicular axes, one such axis being horizontal and running longitudinally of said table, control means for governing the actuation of said vertical profiling headstock, and a control for governing the action of said horizontal profiling headstock, said housing containing a multiple line feed device adapted to feed a plurality of flexible service and control lines to said headstocks.

3. A planer-type milling machine comprising, in combination, a bed, a table reciprocable on said bed, a pair of upstanding columns straddling said bed, a cross rail spanning said columns with its ends overhanging beyond the lateral edges of said table, a vertical profiling headstock slidably secured to said cross rail for movement therealong, a horizontal profiling headstock slidably mounted on said cross rail and located between one end thereof and said vertical profiling headstock, tracer control means for governing the actuation of said vertical profiling headstock, means for supporting profiling cams on said cross rail for coaction with said tracer control means, a second means for supporting profiling cams on said table also for coaction with said tracer control means, and a tracer control for governing the action of said horizontal profiling headstock.

4. In a planer-type milling machine having a table and a cross rail mounted in overlying relation with the table, the combination comprising a saddle mounted on said cross rail for sliding movement therealong, a slide mounted on said saddle for rise and fall movement relative thereto, actuating means interposed between said saddle and said slide for effecting rise and fall movement of the latter, tracer control means for governing the operation of said actuating means and slide in accordance with a predetermined pattern, a first support on said slide and adapted to carry said tracer control means bodily with said slide, said first support serving as an operating station for said tracer control means, and a second support for said tracer control means, said second support being movably mounted adjacent said table and serving as a remote operating station for said tracer control means, and a follow-up means disposed in interconnecting relation between said second support and said slide for moving the two substantially in unison.

5. In a planer-type milling machine having a table and a cross rail mounted in overlying relation with the table, the combination of a saddle mounted on said cross rail for sliding movement therealong, a slide mounted on said saddle for rise and fall movement relative thereto, tool carrying means on said slide, actuating means interposed between said saddle and said slide for effecting rise and fall movement of the latter, a tracer control device for governing the operation of said actuating means and said slide, a first means for bodily supporting said tracer control device on said slide for operation in response to contact with a profile cam on said cross rail, a second means for bodily supporting said tracer control device remote from said slide for operation in response to contact with a profile cam on said table, said second support means being movably mounted adjacent said table, and a connection disposed between said second support means and said rise and fall slide for moving said second support means in unison with said rise and fall slide.

6. In a planer-type milling machine having a table and a cross rail mounted in overlying relation with the table, the combination of a saddle mounted on said cross rail for sliding movement therealong, a profiling slide mounted on said saddle for rise and fall movement relative thereto, tool carrying means on said profiling slide, means yieldably counterbalancing said profiling slide, a hydraulic actuator interposed between said saddle and said profiling slide for effecting rise and fall movement of the latter, a cam actuated tracer control valve for governing the operation of said hydraulic actuator and said profiling slide, a first bracket for bodily supporting said tracer control valve on said profiling slide for operation in response to contact with a profile cam on said cross rail, a second bracket for bodily supporting said tracer control valve remote from said profiling slide for operation in response to contact with a profile cam on said table, said second support bracket being movably mounted adjacent said table, and a double acting mechanical connection disposed between said second support bracket and said profiling slide for moving said second support bracket in unison with said profiling slide, said mechanical connection being of relatively large size in proportion to the forces transmitted so as to minimize deformation effects.

7. In a planer-type milling machine having a vertical profiling headstock adapted for tracer control operation, the combination comprising a rise and fall slide housed within said headstock, a tracer control slide mounted for rise and fall movement in a location remote from said headstock, means on said tracer control slide for supporting a tracer control device having operative connections with the actuating means of said rise and fall slide, and a counterbalanced gear train mechanically linking said tracer control slide with said rise and fall slide for movement in unison therewith.

8. In a planer-type milling machine having a cross rail with a vertical profiling headstock translatable therealong and adapted for tracer control operation, the combination comprising a rise and fall slide housed within said headstock, a tracer control slide mounted in a location remote from said headstock, antifriction means permitting rise and fall movement of said tracer control slide, an adjustable support on said tracer control slide for carrying a tracer control device having operative connections with the actuating means of said rise and fall slide, a rack fixed to said rise and fall slide, a rack fixed to said tracer control slide, and means including a splined countershaft running longitudinally of said cross rail, said countershaft having a slidable gear thereon interconnecting said tracer control slide with said rise and fall slide for movement in unison therewith.

9. In a planer-type milling machine having a table straddled by a pair of machine columns with a cross rail spanning said columns, said machine also having a vertical profiling headstock translatable along said cross rail and adapted for tracer control operation, the combination comprising a rise and fall slide housed within said headstock, a fixed saddle mounted on one of said machine columns in a location adjacent said table but remote from said headstock, a tracer control slide mounted on said fixed saddle, antifriction elements between said fixed saddle and said tracer control slide permitting rise and fall movement of the latter, an adjustable support on said tracer control slide for carrying a tracer control device having operative connections with the actuating means of said rise and fall slide, said device being responsive to a profiling cam on said table, a rack adjustably fixed to said tracer control slide, a first shaft journaled in said cross rail and having a gear connection with said rack, a splined countershaft running longitudinally of said cross rail, said countershaft having a gear connection with said first shaft, a rack fixed to said rise and fall slide, and a slidable gear on said splined countershaft disposed in meshing engagement with said rack on said rise and fall slide.

10. A planer-type skin miller for machining metal plates and the like, said skin miller comprising, in combination, a bed, a table mounted for horizontal reciprocatory movement on said bed, a pair of upstanding columns straddling said bed, a cross beam assembly including a cross rail spanning said columns with its ends overhanging beyond the lateral edges of said table, a vertical profiling headstock slidably secured to said cross rail for movement therealong, a horizontal profiling headstock slidably mounted on said cross rail and located between one end thereof and said vertical profiling headstock, said headstocks being operable for vertical and horizontal profiling simultaneously with said horizontal movement of the table, control means for governing the actuation of said vertical profiling headstock, and control means for governing the action of said horizontal profiling headstock, so that said headstocks are automatically caused to travel in a predetermined path relative to the moving table for machining a workpiece.

11. In a planer type milling machine, the combination comprising, a table for supporting a workpiece to be machined and a pair of upstanding columns straddling said table, said table and said columns being mounted for relative horizontal movement at predetermined velocities, a cross rail spanning said columns, a headstock mounted on said cross rail and supporting a milling cutter for engagement with said workpiece, said headstock including power means for rotating said milling cutter, said headstock being movable along said cross rail for cross milling, a first power drive for moving said headstock along the cross rail, said headstock being further mounted for rise and fall movement simultaneously with said relative horizontal movement of said table and columns for rise and fall contour milling of said workpiece, a second power drive for imparting rise and fall movement to said headstock, and control means for governing actuation of said first and second drives so that said headstock is automatically caused to travel in a predetermined path relative to the table and workpiece.

12. In a planer type milling machine, the combination comprising, a table for supporting a workpiece to be machined and a pair of upstanding columns straddling said table, said table and said columns being mounted for relative horizontal movement at predetermined velocities, a cross rail spanning said columns and adjustable vertically thereon, a headstock assembly traversable over the table and mounted for rise and fall movement simultaneously with traverse movement for contour milling of the workpiece, including a saddle mounted on said cross rail for horizontal sliding movement therealong and a slide adjustable vertically on said saddle and carrying a self-powered cutter head, a first power drive for moving said saddle along the cross rail at pre-selected velocities, a second power drive for imparting rise and fall movement to said slide independent of the rate of movement of said saddle, and control means for governing actuation of said first and second power drives so that said cutter head is automatically caused to travel in a predetermined path relative to the table for machining the workpiece.

13. In a planer type milling machine, the combination comprising, a table for supporting a workpiece to be machined and a pair of upstanding columns straddling said table, said table and said columns being mounted for relative horizontal movement at predetermined velocities, a cross rail spanning said columns and adjustable vertically thereon, headstock means traversable over the table and including a horizontally movable power driven milling cutter mounted for horizontal movement along said cross rail simultaneously with said relative movement of said table and columns for milling the workpiece, headstock means traversable over the table and mounted for rise and fall movement simultaneously with traverse movement and including a saddle mounted on said cross rail for horizontal sliding movement therealong and a vertically movable power driven milling cutter mounted for rise and fall movement on said saddle for milling the workpiece, independent power drives for actuating said headstock means for obtaining horizontal movement of said horizontally movable power driven milling cutter and vertical movement of said vertically movable power driven milling cutter respectively, and control means for governing the actuation of said independent power drives so that said headstock means is automatically caused to travel in a predetermined path relative to the table for machining the workpiece.

14. In a planer-type skin milling machine, the combination comprising, a bed, a table for supporting a metal slab workpiece to be machined, said table being mounted for horizontal reciprocatory movement at predetermined velocities on said bed, a pair of upstanding columns straddling said table, a cross-rail spanning said columns and adjustable vertically for establishing the height of said cross-rail above said table, headstock means mounted on said cross-rail for performing profiling operations involved in the machining of the metal slab workpiece, said headstock means including a horizontally movable saddle and a rise and fall slide mounted on the saddle, said headstock means also including a second horizontally movable saddle, independent power drives connected to the saddles of said headstock means for moving the same along the cross-rail, a power drive connected to the rise and fall slide of said headstock means for obtaining rise and fall movement thereof, and control means for governing the actuation of said power drives so that said headstock means is automatically caused to travel in a predetermined path relative to the table for machining the metal slab workpiece.

No references cited.